US005615027A

United States Patent [19]

Kuribayashi et al.

[11] Patent Number: 5,615,027

[45] **Date of Patent: *Mar. 25, 1997**

[54] LIQUID CRYSTAL APPARATUS AND DISPLAY SYSTEM

[75] Inventors: Masaki Kuribayashi, Inagi; Yukiko Futami, Sagamihara; Hiroshi Inoue, Yokohama; Akira Tsuboyama, Sagamihara; Yutaka Inaba, Kawaguchi, all of Japan

[73] Assignee: Canon Kabushiki Kaisha, Tokyo, Japan

[ * ] Notice: The term of this patent shall not extend beyond the expiration date of Pat. No. 5,124,820.

[21] Appl. No.: 375,181

[22] Filed: Jan. 18, 1995

Related U.S. Application Data

[60] Continuation of Ser. No. 61,662, May 14, 1993, abandoned, which is a division of Ser. No. 426,083, Oct. 24, 1989, Pat. No. 5,233,447.

[30] Foreign Application Priority Data

| | | | |
|---|---|---|---|
| Oct. 26, 1988 | [JP] | Japan | 63-271812 |
| Oct. 26, 1988 | [JP] | Japan | 63-271813 |
| Nov. 5, 1988 | [JP] | Japan | 63-280122 |
| Nov. 5, 1988 | [JP] | Japan | 63-280123 |

[51] Int. Cl.[6] .......... G02F 1/1343

[52] U.S. Cl. .......... 345/87

[58] Field of Search .......... 359/56, 84, 87, 359/63, 88, 89; 340/784

[56] References Cited

U.S. PATENT DOCUMENTS

| | | | |
|---|---|---|---|
| 4,763,995 | 8/1988 | Katagiri et al. | 359/76 |
| 4,770,501 | 9/1988 | Tamura et al. . | |
| 4,770,502 | 9/1988 | Kitazima et al. | 350/350 S |
| 4,778,260 | 10/1988 | Okada et al. | 350/350 S |
| 4,824,212 | 4/1989 | Taniguchi | 350/333 |
| 4,902,103 | 2/1990 | Miyake et al. | 359/87 |
| 4,929,058 | 5/1990 | Numao | 350/333 |
| 5,018,841 | 5/1991 | Mouri et al. | 359/56 |
| 5,041,821 | 8/1991 | Onitsuka et al. | 359/56 |
| 5,124,820 | 6/1992 | Tsuboyama et al. | 359/56 |
| 5,233,447 | 8/1993 | Kuribayashi et al. | 359/56 |

FOREIGN PATENT DOCUMENTS

| | | |
|---|---|---|
| 0149899 | 7/1985 | European Pat. Off. . |
| 0261901 | 3/1988 | European Pat. Off. . |
| 2578670 | 9/1986 | France . |
| 107216 | 8/1981 | Japan . |

*Primary Examiner*—Mahshid D. Saadat
*Assistant Examiner*—Courtney A. Bowers
*Attorney, Agent, or Firm*—Fitzpatrick, Cella, Harper & Scinto

[57] ABSTRACT

A liquid crystal apparatus, includes: a) a liquid crystal device comprising an electrode matrix composed of scanning electrodes and data electrodes, and a ferroelectric liquid crystal showing a first and a second orientation state; and b) a driving means including: a first drive means for applying a scanning selection signal to the scanning electrodes two or more scanning electrodes apart in one vertical scanning so as to effect one picture scanning in plural times of vertical scanning, said scanning selection signal having a voltage of one polarity and a voltage of the other polarity with respect to the voltage level of a nonselected scanning electrode, and a second drive means for applying to a selected data electrode a voltage signal which provides a voltage causing the first orientation state of the ferroelectric liquid crystal in combination with the voltage of one polarity of the scanning selection signal, and applying to another data electrode a voltage signal which provides a voltage causing the second orientation state of the ferroelectric liquid crystal in combination with the voltage of the other polarity of the scanning selection signal.

27 Claims, 36 Drawing Sheets

| ADDRESS | DATA | | |
|---|---|---|---|
| A11 | 0 | 1 | 0 |
| A12 | 0 | 1 | 0 |
| A13 | 0 | 0 | 1 |
| A14 | 1 | 0 | 0 |
| A21 | 1 | 1 | 0 |
| A22 | 0 | 1 | 1 |
| A23 | 1 | 0 | 1 |
| A24 | 1 | 0 | 1 |
| A31 | 0 | 1 | 1 |
| A32 | 0 | 1 | 1 |
| A33 | 1 | 0 | 0 |
| A34 | 0 | 0 | 1 |
| A41 | 0 | 0 | 0 |
| A42 | 1 | 1 | 1 |
| A43 | 0 | 1 | 1 |
| A44 | 1 | 1 | 0 |

FIG. 15

M3

| | | | |
|---|---|---|---|
| 0 | 0 | 0 | 1 |
| 1 | 0 | 1 | 1 |
| 0 | 0 | 1 | 0 |
| 0 | 1 | 0 | 1 |

FIG. 16A

M2

| | | | |
|---|---|---|---|
| 1 | 1 | 0 | 0 |
| 1 | 1 | 0 | 0 |
| 1 | 1 | 0 | 0 |
| 0 | 1 | 1 | 1 |

FIG. 16B

M1

| | | | |
|---|---|---|---|
| 0 | 0 | 1 | 0 |
| 0 | 1 | 1 | 1 |
| 1 | 1 | 0 | 1 |
| 0 | 1 | 1 | 0 |

FIG. 16C

| | | | |
|---|---|---|---|
| 2 | 2 | 1 | 4 |
| 6 | 3 | 5 | 5 |
| 3 | 3 | 4 | 1 |
| 0 | 7 | 3 | 6 |

FIG. 16D

LIQUID CRYSTAL APPARATUS AND DISPLAY SYSTEM

This application is a continuation of application Ser. No. 08/061,662, filed May 14, 1993, now abandoned, which is a division of application Ser. No. 07/426,083, filed Oct. 24, 1989, now U.S. Pat. No. 5,233,447.

FIELD OF THE INVENTION AND RELATED ART

The present invention relates to a display apparatus using a ferroelectric liquid crystal, particularly a liquid crystal apparatus and a display system free from occurrence of noticeable flicker.

In a liquid crystal television panel using the conventional active-matrix drive system, thin film transistors (TFT) are disposed in a matrix corresponding to respective pixels, and a gradational display is performed in such a manner that a TFT is supplied with a gate-on pulse to make the source and drain conductive between each other, an image signal is supplied through the source at that time to be stored in a capacitor, and a liquid crystal (e.g., a twisted nematic (TN) liquid crystal) at the pixel is driven corresponding to the stored signal while modulating the voltage of the image signal.

In such a television panel of the active matrix drive system using a TN-liquid crystal, each TFT used has a complicated structure requiring many steps for production, so that a high production cost is incurred and also it is difficult to form a thin film semiconductor of, e.g., polysilicon or amorphous silicon constituting TFTs over a wide area.

On the other hand, a display panel of the passive matrix system using a TN-liquid crystal has been known as one which can be attained at a low production cost. In this type of display panel, however, a duty ratio, i.e., a ratio of time wherein a selected point is supplied with an effective electric field during scanning of one picture (one frame), is decreased at a rate of 1/N if the number (N) of scanning lines is increased so that crosstalk is caused and an image of high contrast cannot be formed. Further, as the duty ratio is lowered, it becomes difficult to control the gradation of each pixel by voltage modulation. Thus, this type of liquid crystal panel is not suitable as a display panel with a high density of lines, particularly as a liquid crystal television panel.

In recent years, the use of a liquid crystal device showing bistability has been proposed by Clark and Lagerwall as an improvement to the conventional liquid crystal devices in U.S. Pat. No. 4,367,924; JP-A (Kokai) 56-107216; etc. As the bistable liquid crystal, a ferroelectric liquid crystal (hereinafter sometimes abbreviated as "FLC") showing chiral smectic C phase (SmC*) or H phase (SmH*) is generally used. The ferroelectric liquid crystal assumes either a first optically stable state or a second optically stable state in response to an electric field applied thereto and retains the resultant state in the absence of an electric field, thus showing a bistability. Further, the ferroelectric liquid crystal quickly responds to a change in electric field, and thus the ferroelectric liquid crystal device is expected to be widely used in the field of a high-speed and memory-type display apparatus, etc.

However, the above-mentioned ferroelectric liquid crystal device has involved a problem of flickering at the time of multiplex driving. For example, European Laid-Open Patent Application (EP-A) 149899 discloses a multiplex driving method comprising applying a scanning selection signal of an AC voltage the polarity of which is reversed (or the signal phase of which is reversed) for each frame to selectively write a "white" state (in combination with cross nicol polarizers arranged to provide a "bright" state at this time) in a former frame and then selectively write a "black" state (in combination with the cross nicol polarizers arranged to provide a "dark" state at this time) in a subsequent frame. In addition to the above driving method, those driving methods as disclosed by U.S. Pat. Nos. 4,548,476 and 4,655,561 have been known.

In such a driving method, at the time of selective writing of "black" after a selective writing of "white", a pixel selectively written in "white" in the previous frame is placed in a half-selection state, whereby the pixel is supplied with a voltage which is smaller than the writing voltage but is still effective. As a result, at the time of selective writing of "black" in the multiplex driving method, selected pixels for writing "white" constituting the background of a black image are wholly supplied with a half-selection voltage in a ½ frame cycle (½ of a reciprocal of one frame or picture scanning period) so that the optical characteristic of the white selection pixels varies in each of the ½ frame cycle. As a number of white selection pixels is much larger than the number of black selection pixels in a display of a black image, e.g., character, on a white background, the white background causes flickering. Occurrence of a similar flickering is observable also on a display of white characters on the black background opposite to the above case. In case where an ordinary frame frequency is 30 Hz, the above half-selection voltage is applied at a frequency of 15 Hz which is a ½ frame frequency, so that it is sensed by an observer as a flickering to remarkably degrade the display quality.

Particularly, in driving of a ferroelectric liquid crystal at a low temperature, it is necessary to use a longer driving pulse (scanning selection period) than that used at a ½ frame frequency of 15 Hz for a higher temperature to necessitate scanning drive at a lower ½ frame frequency of, e.g., 5–10 Hz. This leads to occurrence of a noticeable flickering due to a low frame frequency drive at a low temperature.

SUMMARY OF THE INVENTION

An object of the present invention is to provide a liquid crystal apparatus wherein occurrence of flickering caused by a low frame frequency scanning drive, is suppressed.

Another object of the present invention is to provide a liquid crystal apparatus for realizing a gradational display free from flickering.

A further object of the present invention is to provide a liquid crystal apparatus preventing occurrence of image flow.

According to an aspect of the present invention, there is provided a liquid crystal apparatus, comprising:

a) a liquid crystal device comprising an electrode matrix composed of scanning electrodes and data electrodes, and a ferroelectric liquid crystal showing a first and a second orientation state; and b) a driving means including:

a first drive means for applying a scanning selection signal to the scanning electrodes two or more scanning electrodes apart in one vertical scanning so as to effect one picture scanning in plural times of vertical scanning, said scanning selection signal having a voltage of one polarity and a voltage of the other polarity with respect to the voltage level of a nonselected scanning electrode, and a second drive means for applying to a selected data electrode a voltage signal which provides a voltage causing the first orientation state of the ferroelectric liquid crystal in combination with the voltage of one polarity of the scanning selection signal, and applying to another data electrode a voltage signal which provides a voltage causing the second orientation state of the ferroelectric liquid crystal in combination with the voltage of the other polarity of the scanning selection signal.

According to a second aspect of the present invention, there is provided a liquid crystal apparatus, comprising:

a) a liquid crystal device comprising an electrode matrix composed of scanning electrodes and data electrodes, and a ferroelectric liquid crystal showing a first and a second orientation state; and b) a driving means including:

a first means for sequentially applying a scanning selection signal to scanning electrodes which are not adjacent to each other in one vertical scanning so as to effect one picture scanning in plural times of vertical scanning, said scanning selection signal having a former voltage of one polarity and a latter voltage of the other polarity with respect to the voltage level of a nonselected scanning electrode, two successive scanning selection signals including a former and a latter scanning selection signal being applied to the scanning electrodes in such a time relationship that the former voltage of one polarity of the latter scanning selection signal is commenced to be applied before the completion of a data signal associated with the former scanning selection signal and after the application of the voltage of one polarity of the former scanning selection signal, and a second means for applying to all or a prescribed number of the data electrodes a voltage signal which provides a voltage causing the first orientation state of the ferroelectric liquid crystal in combination with the voltage of one polarity of the scanning selection signal, and applying to a selected data electrode a voltage signal which provides a voltage causing the second orientation state of the ferroelectric liquid crystal.

According to a third aspect of the present invention, there is provided a liquid crystal apparatus, comprising:

a) a liquid crystal device comprising an electrode matrix composed of scanning electrodes and data electrodes intersecting with the scanning electrodes, and a ferroelectric liquid crystal showing a first and a second orientation state; and b) a driving means including:

a first drive means for, prior to application of a scanning selection signal, applying a voltage causing the first orientation state of the ferroelectric liquid crystal to the intersections of plural scanning electrodes and the data electrodes by applying a voltage of one polarity to the plural scanning electrodes, a second drive means for applying a scanning selection signal to the scanning electrodes two or more scanning electrodes apart in one vertical scanning so as to effect one picture scanning in plural times of vertical scanning, said scanning selection signal having a voltage of a polarity opposite to that of the voltage of one polarity with respect to the voltage level of a non-selected scanning electrode; and applying to a selected data electrode a voltage causing the second orientation state of the ferroelectric liquid crystal in combination with the scanning selection signal.

According to a further aspect of the present invention, there is provided a liquid crystal apparatus, comprising:

a) a liquid crystal device comprising an electrode matrix composed of scanning electrodes and data electrodes, and a ferroelectric liquid crystal showing a first and a second orientation state; and b) a driving means including:

a first drive means for sequentially applying a scanning selection signal to scanning electrodes which are not adjacent to each other in one vertical scanning so as to effect one picture scanning in plural times of vertical scanning and effect one gradational picture scanning in plural times of one picture scanning, and a second drive means for applying data signals to the data electrodes in synchronism with the scanning selection signal.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 15 and 16A–16D are illustrative gradation data at pixels;

DESCRIPTION OF THE PREFERRED EMBODIMENTS

The present invention will be explained based on an embodiment applicable to a ferroelectric liquid crystal (FLC).

Figure 1:
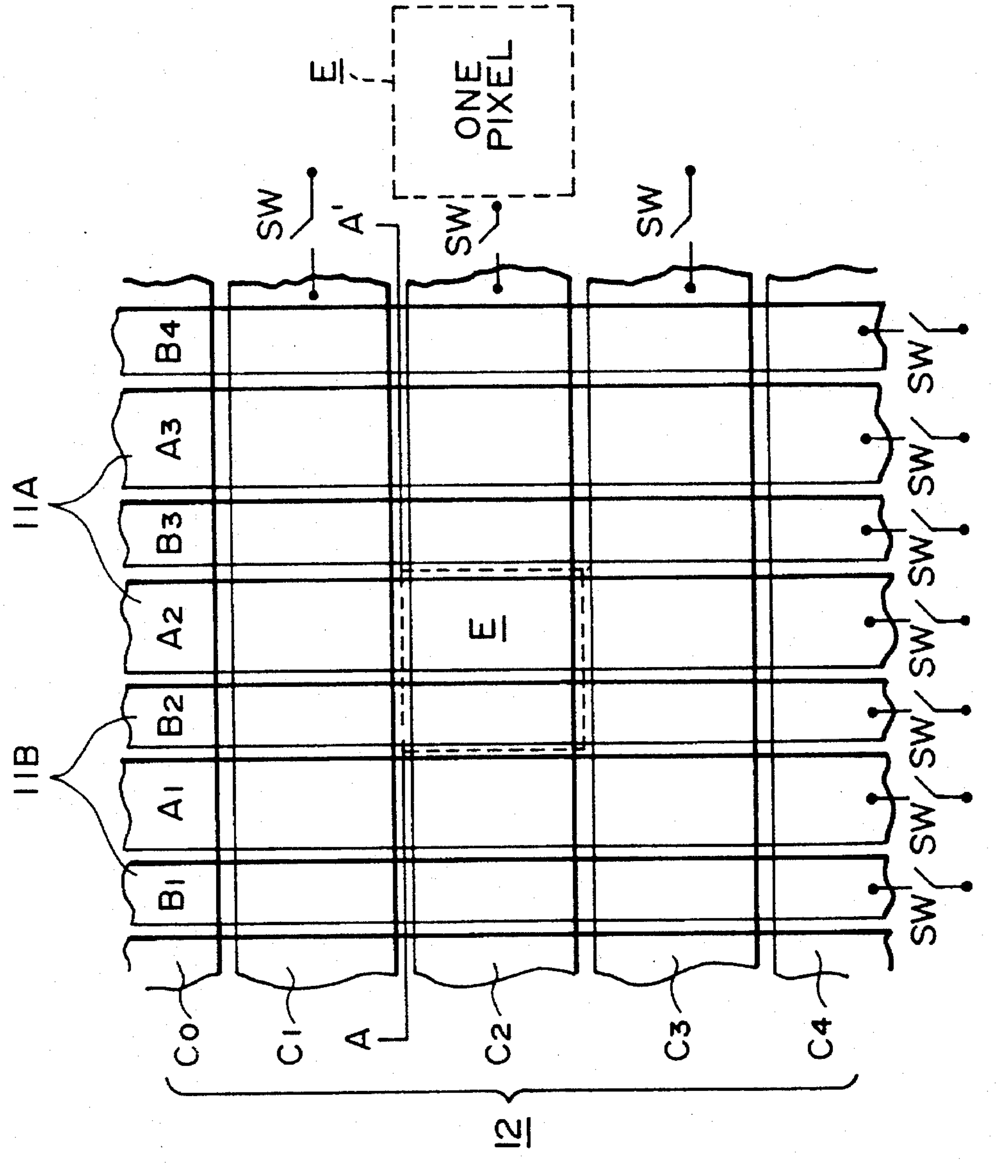
FIG. 1 is a plan view of an electrode matrix or matrix electrode structure of an FLC device used in the present invention.
Figure 2:
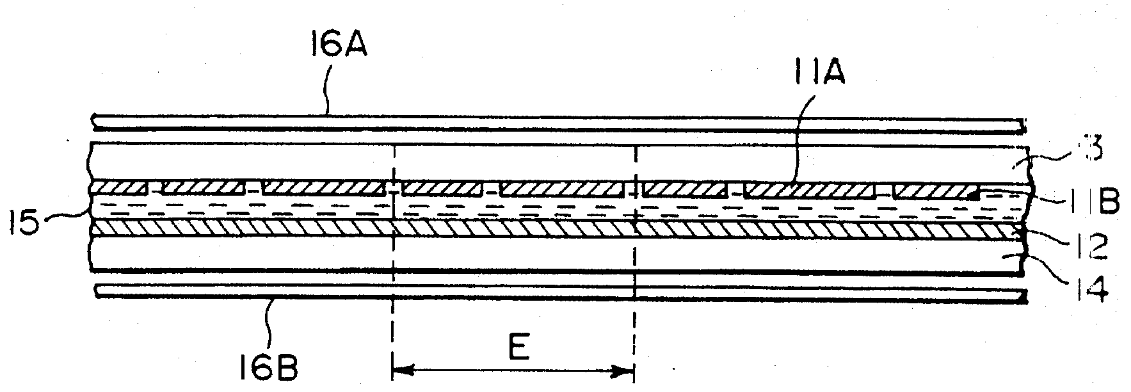
FIG. 2 is a sectional view taken along the line A–A' of the FLC device shown in FIG. 1.
Figure 3:
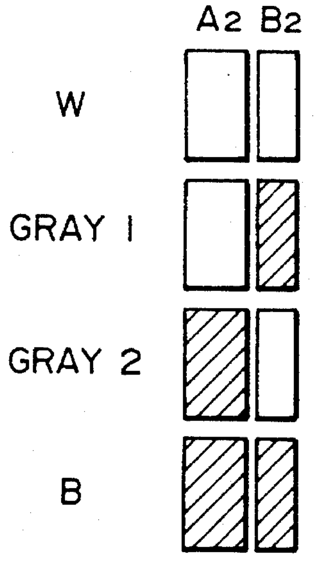
FIG. 3 is an illustration of intermediate gradations.

FIG. 1 is a schematic plan view of a matrix electrode structure of an FLC device according to an embodiment of the present invention and FIG. 2 is a sectional view taken along the line A–A' in FIG. 1. Referring to these figures, the FLC device comprises upper electrodes 11A ($A_1$, $A_2$, $A_3$, . . . ) and 11B ($B_1$, $B_2$, $B_3$, $B_4$, . . . ) constituting data electrodes, and lower electrodes 12 constituting scanning electrodes C ($C_0$, $C_1$, $C_2$, $C_3$, . . . ). These data electrodes 11A, 11B and scanning electrodes 12 are formed on glass substrates 13 and 14, respectively, and mutually arranged so as to form a matrix with an FLC material 15 disposed therebetween. As shown in the figures, one pixel is constituted by a region E surrounded by a dashed line, i.e., a region where a scanning electrode C ($C_2$ is shown as an example) and two data electrodes A ($A_2$) and B ($B_2$) (electrode width: A>B). In this instance, each data electrode A is composed to have a wider electrode width then an accompanying data electrode B. The scanning electrodes C and the data electrodes A, B are respectively connected to a power supply (not shown) through switches SW (or equivalents thereof). The switches SW are also connected to a controller unit (not shown) for controlling the ON/OFF of the switches. Based on this arrangement, a gray scale display in the pixel E, for example, composed of the scanning electrode $C_2$ and the data electrodes A and B, may be effected under the control by means of the controller circuit as follows. When the scanning electrode $C_2$ is selected or scanned, a white display state ("W") is given by applying a "W" signal to the data electrodes $A_2$ and $B_2$ respectively; a display state of "Gray 1" is given by applying a "W" signal to $A_2$ and a black ("B") signal to $B_2$; a display state of "Gray 2" is given by applying a "B" signal to $A_2$ and a "W" signal to $B_2$; and a black display state ("B" ) is given by applying a "B" signal to $A_2$ and $B_2$ respectively. FIG. 3 shows the resultant states W, Gray 1, Gray 2 and B constituting a gray scale.

In this way, a gray scale of 4 levels can be realized by using FLC which per se is essentially capable of only a binary expression.

In a preferred embodiment of the present invention, a pixel E is composed of a plural number (n) of intersections of electrodes having intersection areas giving a geometric series of ratios such as 1:2:4:8: . . . :$2^{n-1}$ (the minimum intersection area is taken as 1 (unit)).

In the present invention, if a scanning electrode is divided into two electrode stripes having widths C and D and combined with the data electrodes A and B (A≠B), 8 gradation levels can be provided when C=D and 16 gradation levels can be provided when C≠D.

Further, in case where only the data electrode side is split into electrodes A and B, if their widths are set to be equal (A=B) and color filters in complementary colors are disposed on the electrodes A and B, a color display of four colors may be possible. For example, if a complementary color relationship of A=yellow and B=blue or A=magenta and B=green is satisfied, display of four colors of white, black, A's color and B's color becomes possible.

Referring to FIG. 2, the polarizers 16A and 16B are disposed to have their polarization axes intersecting each other, so as to provide a black display in the dark state and a white display in the bright state.

The electrode matrix shown in FIG. 1 may be driven by a driving method as will be described hereinbelow, which however is also applicable to an electrode matrix comprising scanning electrodes and data electrodes with equal electrode widths.

Figure 4A:
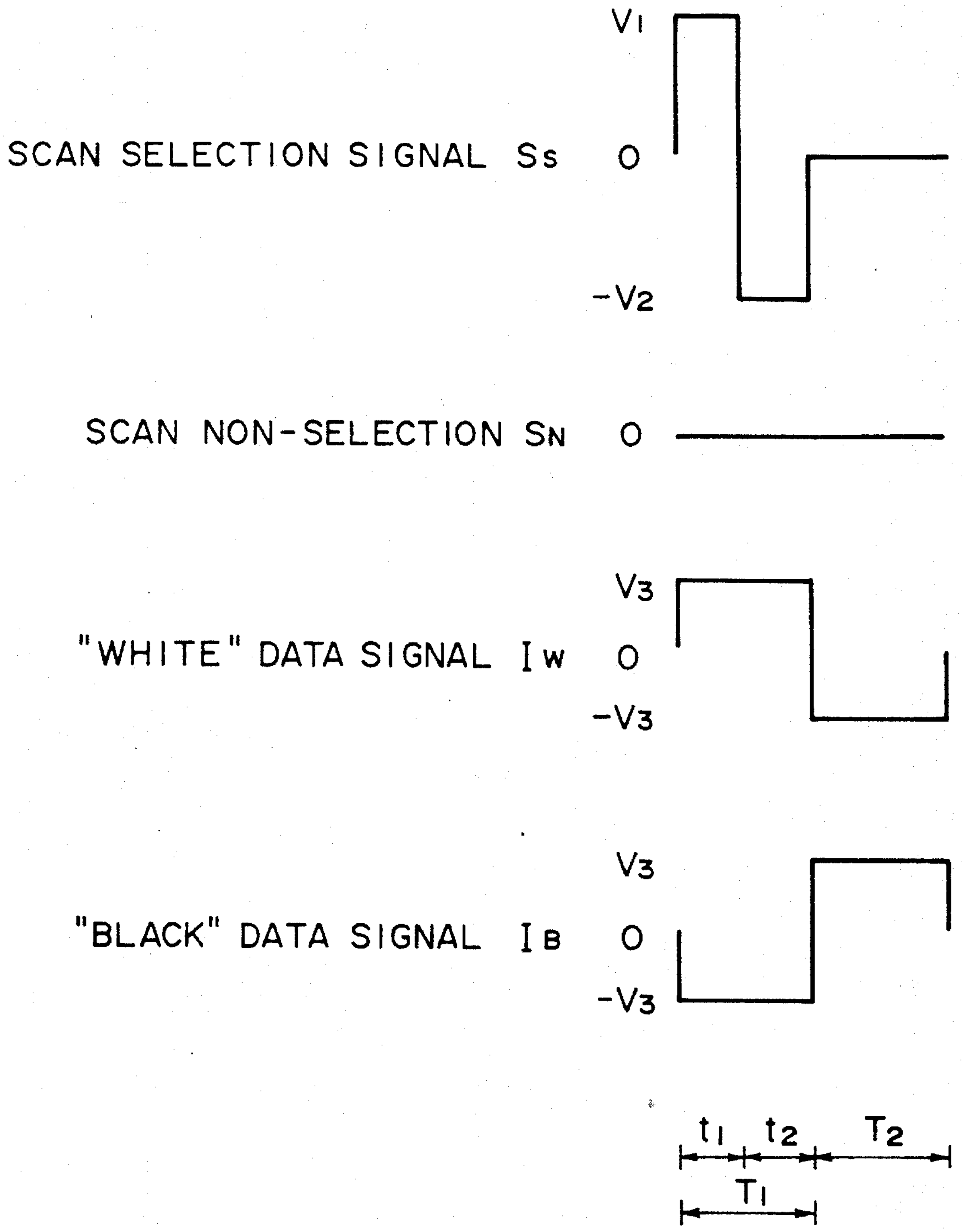
FIGS. 4A–4D are driving waveform diagrams used in the invention.
Figure 4B:
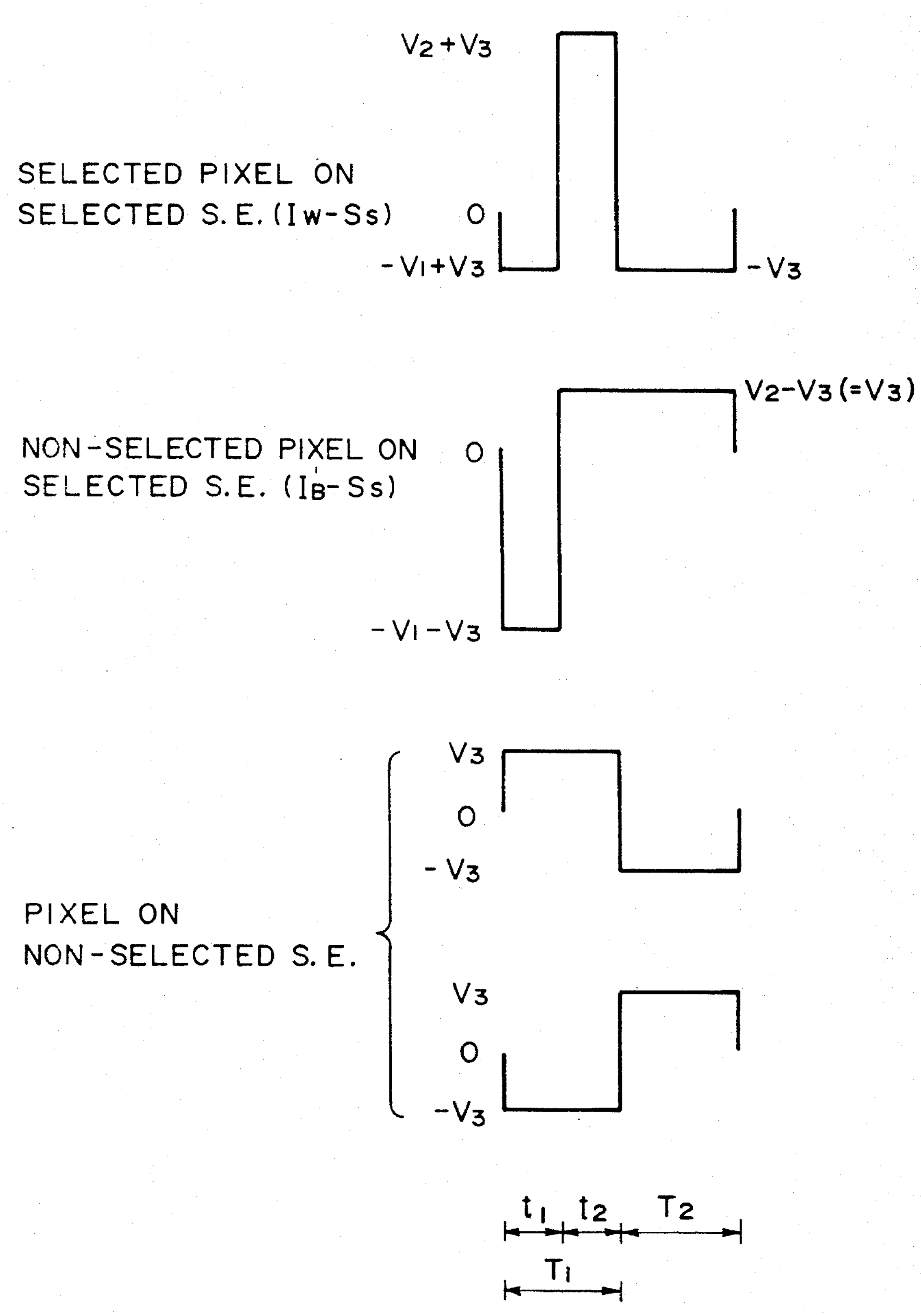

FIG. 4A shows a scanning selection signal $S_S$, a scanning non-selection signal $S_N$, a white data signal $I_W$ and a black data signal $I_B$. FIG. 4B shows a voltage waveform ($I_W$–$S_S$) applied to a selected pixel (receiving a white data signal $I_W$) among the pixels (intersections between scanning electrodes and data electrodes) on a selected scanning electrode receiving a scanning selection signal $S_S$, a voltage waveform ($I_B$–$S_S$) applied to a non-selected pixel (receiving a black data signal $I_B$) on the same selected scanning electrode, and voltage waveforms applied to two types of pixels on non-selected scanning electrodes receiving a scanning non-selection signal $S_N$. According to FIGS. 4A and 4B, in a phase $t_1$, a non-selected pixel on a selected scanning electrode is supplied with a voltage $-(V_1+V_3)$ exceeding one threshold voltage of the ferroelectric liquid crystal to have the ferroelectric liquid crystal assume one orientation state providing a dark state, thus being written in "black". In this phase $t_1$, a selected pixel on the selected scanning electrode is supplied with a voltage $(-V_1+V_3)$ not exceeding the threshold voltages of the ferroelectric liquid crystal so that the orientation state of the ferroelectric liquid crystal is not changed. In a phase $t_2$, the selected pixel on the selected scanning electrode is supplied with a voltage ($V_2$+$_3$) exceeding the other threshold voltage of the ferroelectric liquid crystal to have the ferroelectric liquid crystal assume the other orientation state providing a bright state thus being written in "white". Further, in the phase $t_2$, the non-selected pixel on the selected pixel is supplied with a voltage $(V_2-V_3)$ below the threshold voltages of the ferroelectric liquid crystal to retain the orientation state which is provided in the previous phase $t_1$. On the other hand, in phases $t_1$ and $t_2$, the pixels on non-selected scanning electrodes are supplied with voltages $\pm V_3$ below the threshold voltages of the ferroelectric liquid crystal. As a result, in this embodiment, the pixels on the selected scanning electrode are written in "white" or "black" in a writing phase $T_1$ including the phases $t_1$ and $t_2$, and the pixels retain their written states even when they subsequently receive a scanning non-selection signal.

Further, in phase $T_2$ of this embodiment, voltages having polarities opposite to those of the data signals in the writing phase $T_1$ are applied through the data electrodes. As a result, as shown at the lower part of FIG. 4B, the pixels on the non-selected scanning electrodes are supplied with an AC voltage so that the threshold characteristic of the ferroelectric liquid crystal is improved.

Figure 4C:
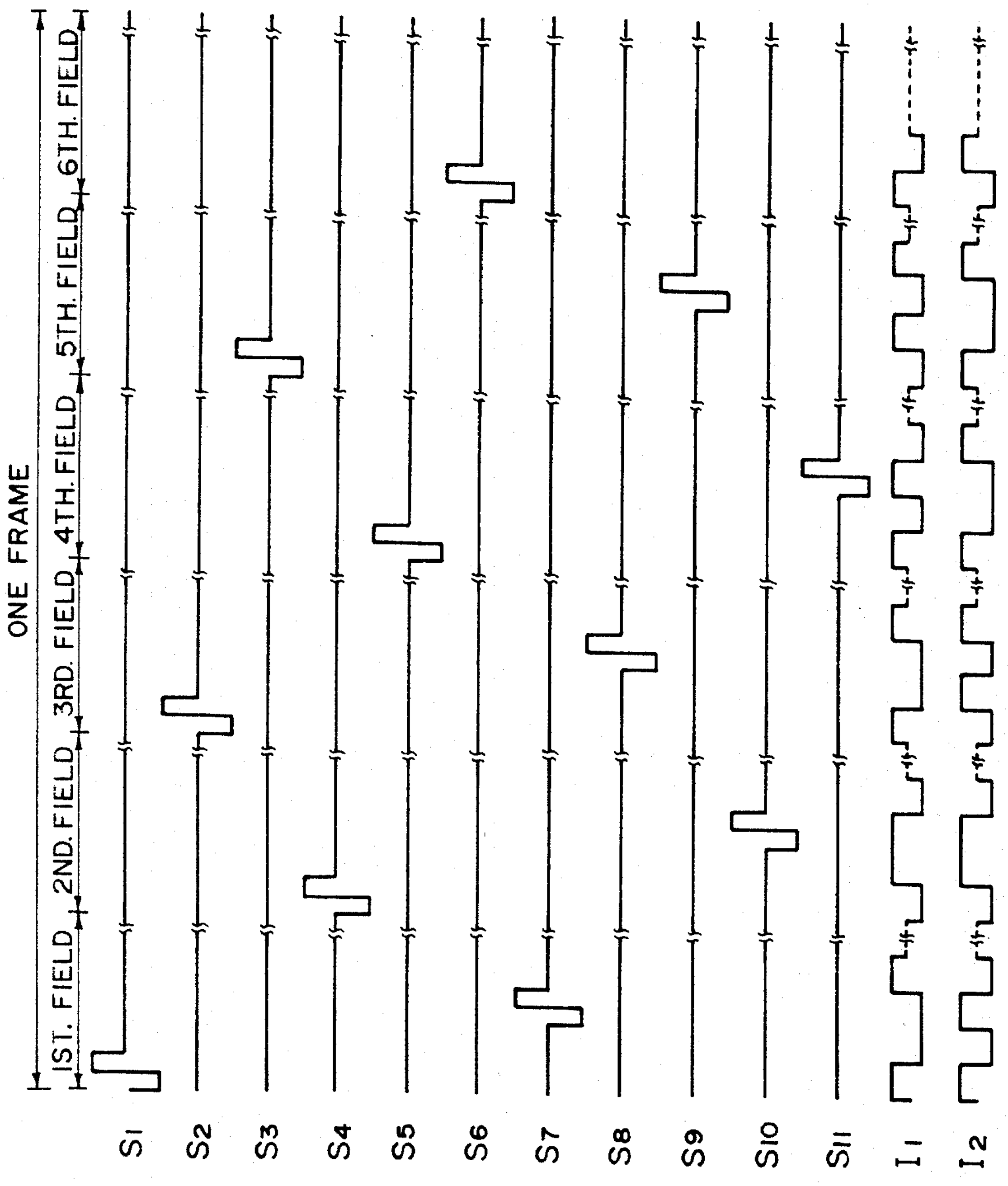
Figure 5:
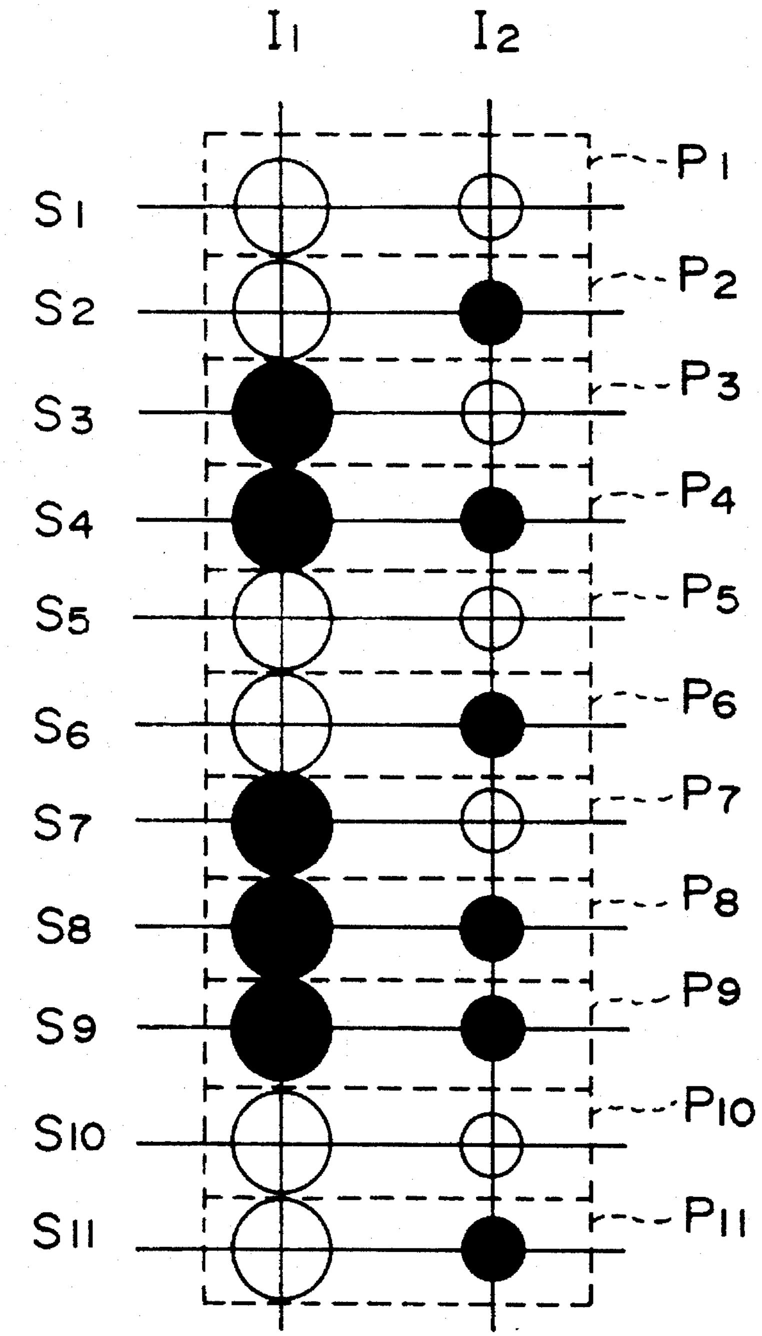
FIG. 5 is a schematic illustration of a display state of a matrix electrode structure.

FIG. 4C is a time chart of a set of voltage waveforms providing a display state shown in FIG. 5. In this embodiment, a scanning selection signal is applied to the scanning electrodes with skipping of 5 lines apart in a field (one vertical scanning) and the scanning selection signal is applied to scanning electrodes which are not adjacent to each other in consecutive 6 fields. In other words, in this embodiment, the scanning electrodes are selected 5 lines (electrodes) apart so that one frame scanning (one picture scanning) is effected in 6 fields of scanning (6 times of one vertical scanning). As a result, the occurrence of a flicker attributable to a low frame frequency drive can be remarkably suppressed even at a lower temperature requiring a longer scanning selection period ($T_1$+$T_2$) and accordingly under a scanning drive at a low frame frequency (of, e.g., 5–10 Hz). Further, as not-adjacent scanning electrodes are selected in consecutive 6 fields of scanning, image flow is effectively removed.

Figure 4D:
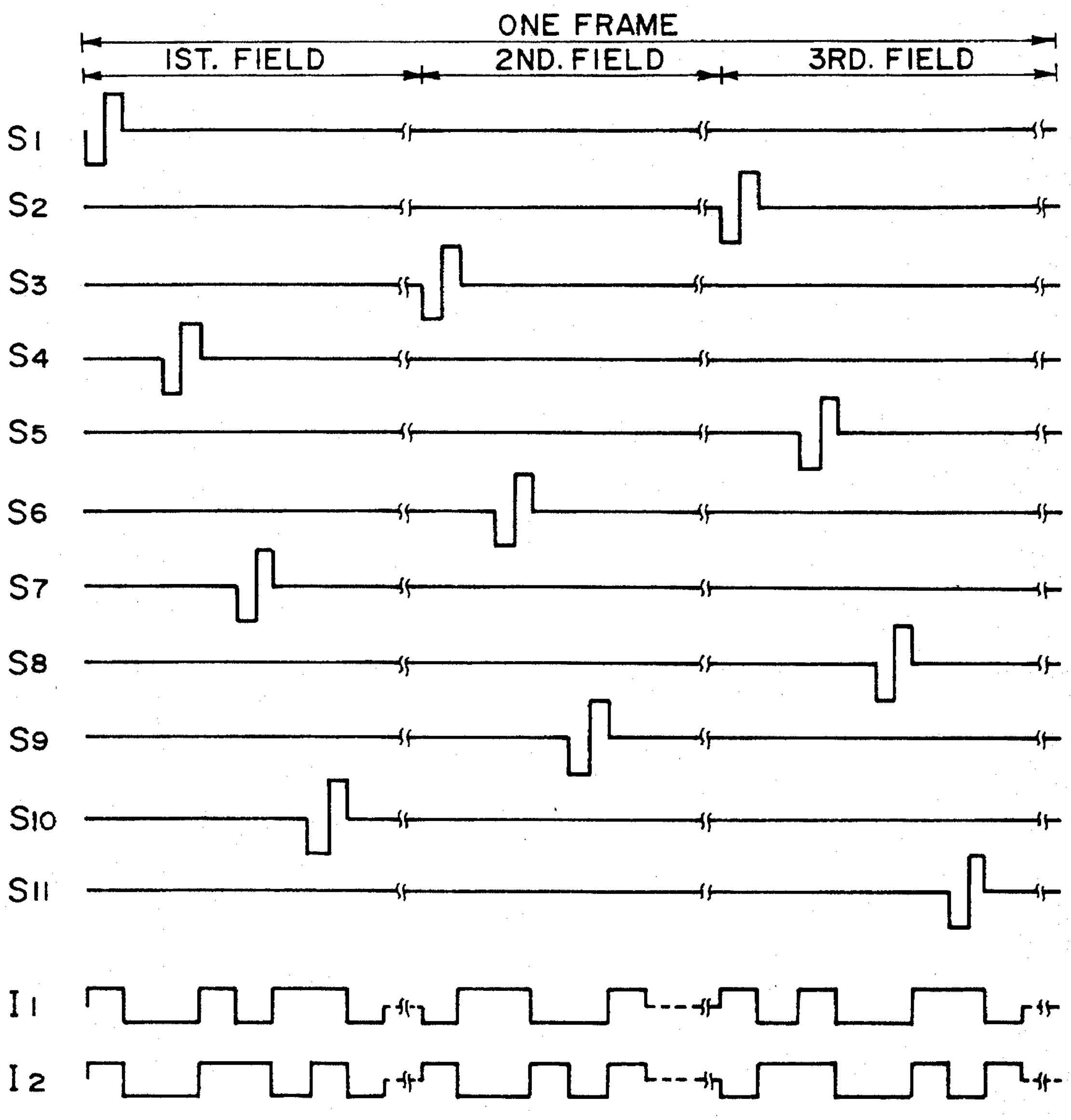

FIG. 4D shows another embodiment using drive waveforms shown in FIG. 4A. In this embodiment, the scanning electrodes are selected two lines apart so that not-adjacent scanning electrodes are selected in consecutive three fields of scanning.

Figure 6A:
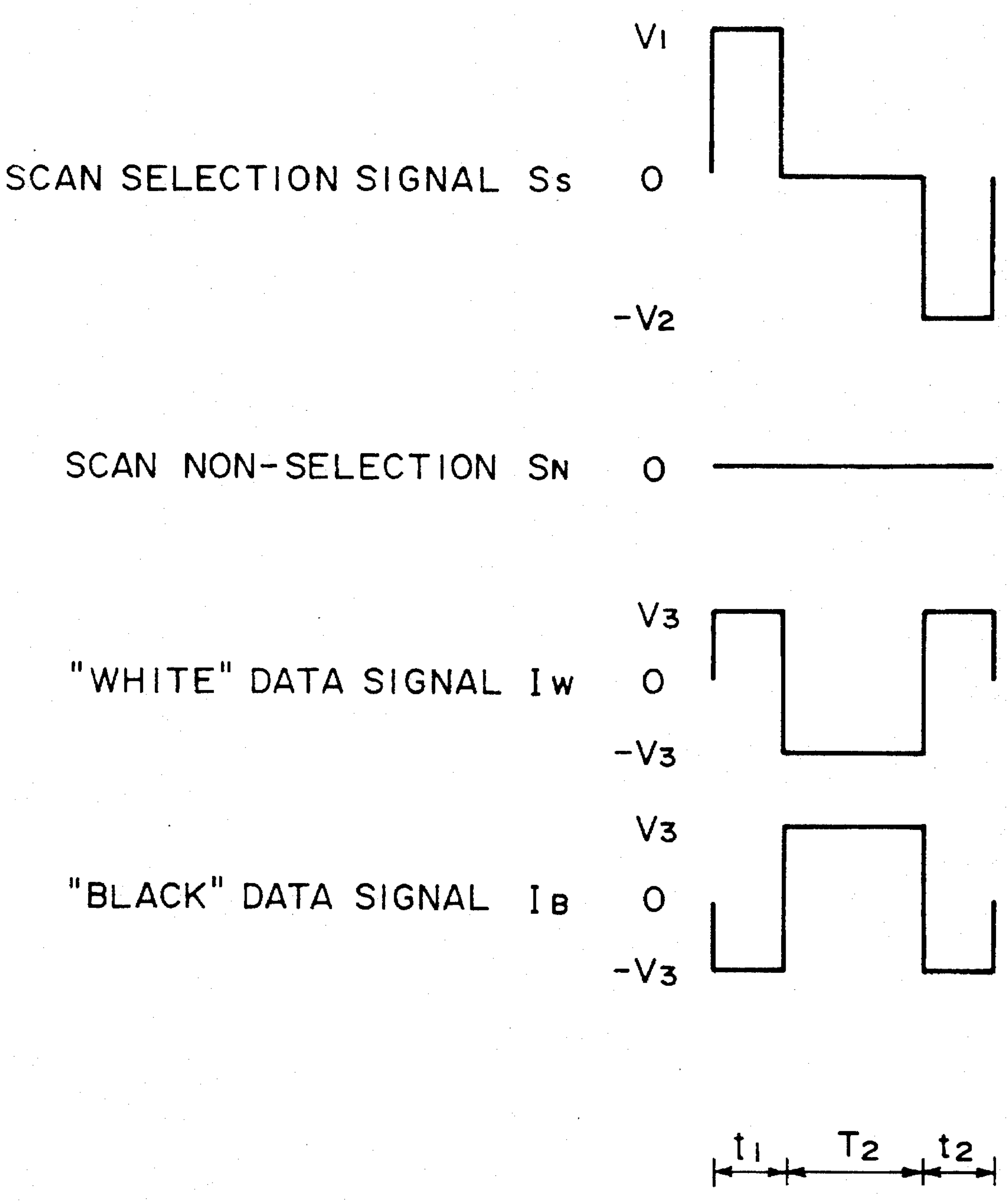
FIGS. 6A–6C show a set of driving waveform diagrams used in the invention.
Figure 6B:
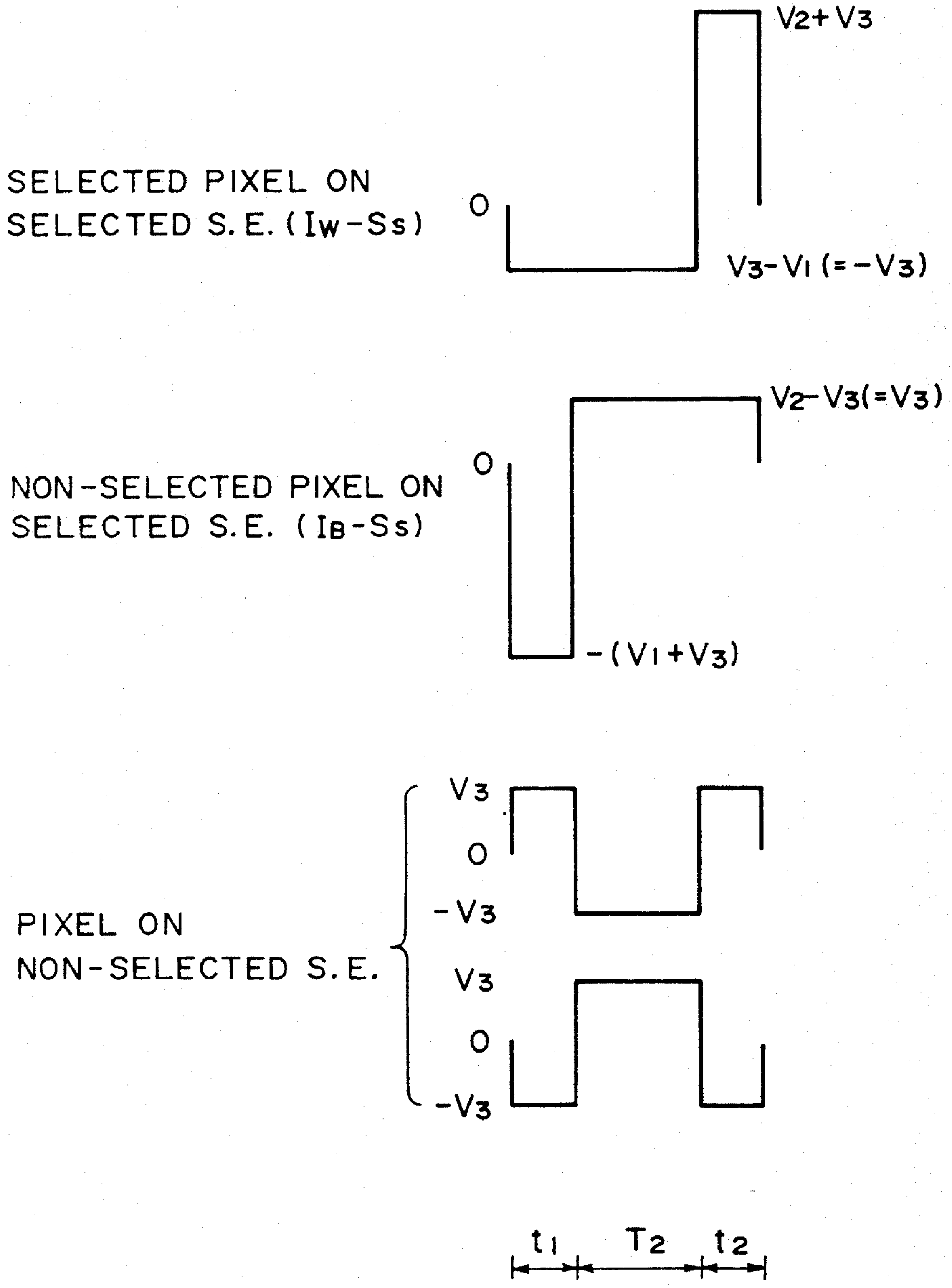

FIGS. 6A and 6B show another driving embodiment used in the present invention. According to FIGS. 6A and 6B, "black" is written in phase $t_1$ and "white" is written in phase $t_2$. In an intermediate phase $T_2$, an auxiliary signal is applied through data electrodes so as to apply an AC voltage to the pixels at the time of non-selection similarly as in the previous embodiment. Such an auxiliary signal shows the effect as disclosed in U.S. Pat. No. 4,655,561, etc.

Figure 6C:
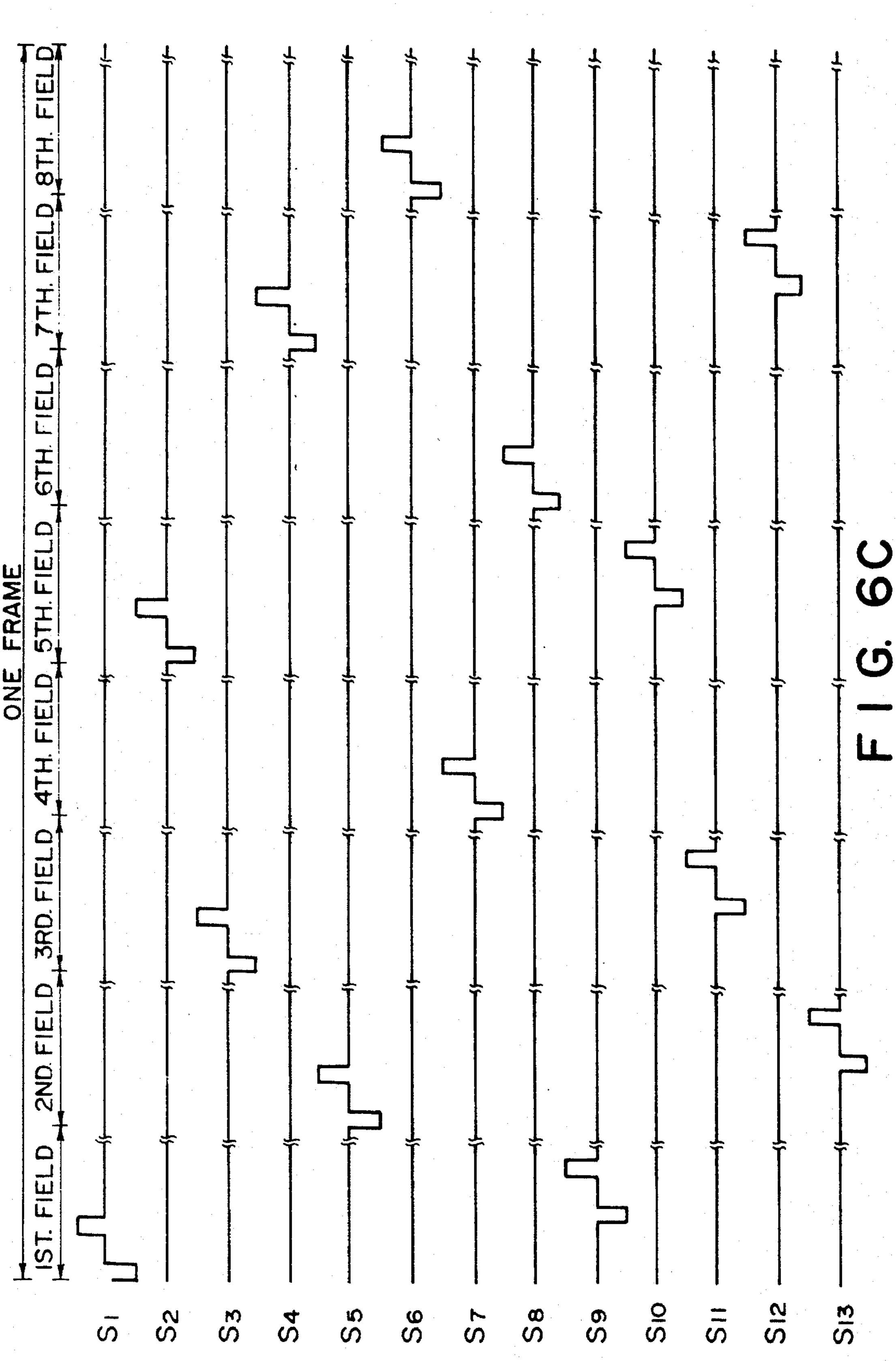

FIG. 6C is a time chart showing application of scanning selection signals using driving waveforms shown in FIGS. 6A and 6B. In the drive embodiment shown in FIG. 6C, the scanning selection signal is applied to the scanning electrodes with skipping of 7 lines apart and one frame scanning is completed in 8 fields of scanning. Also in this embodiment, the scanning selection signal is applied to not-adjacent scanning electrodes in consecutive 8 fields of scanning.

The present invention is not restricted to the above-described embodiments. Particularly, a scanning selection signal may be applied to the scanning electrodes with skipping of 4 or more lines apart, preferably 5–20 lines apart. Further, in the above embodiments, the peak values of the voltage signals $V_1$, $-V_2$ and $\pm V_3$ may preferably be set to satisfy the relation of $|V_1|=|-V_2|>|\pm V_3|$, particularly $|V_1|=|-V_2|\geqq 2|\pm V_3|$. Further, the pulse durations of these voltage signals may be set to 1 μsec–1 msec, preferably 10 μsec–100 μsec, and it is preferred to set a longer pulse duration at a lower temperature than at a higher temperature.

Figure 7A:
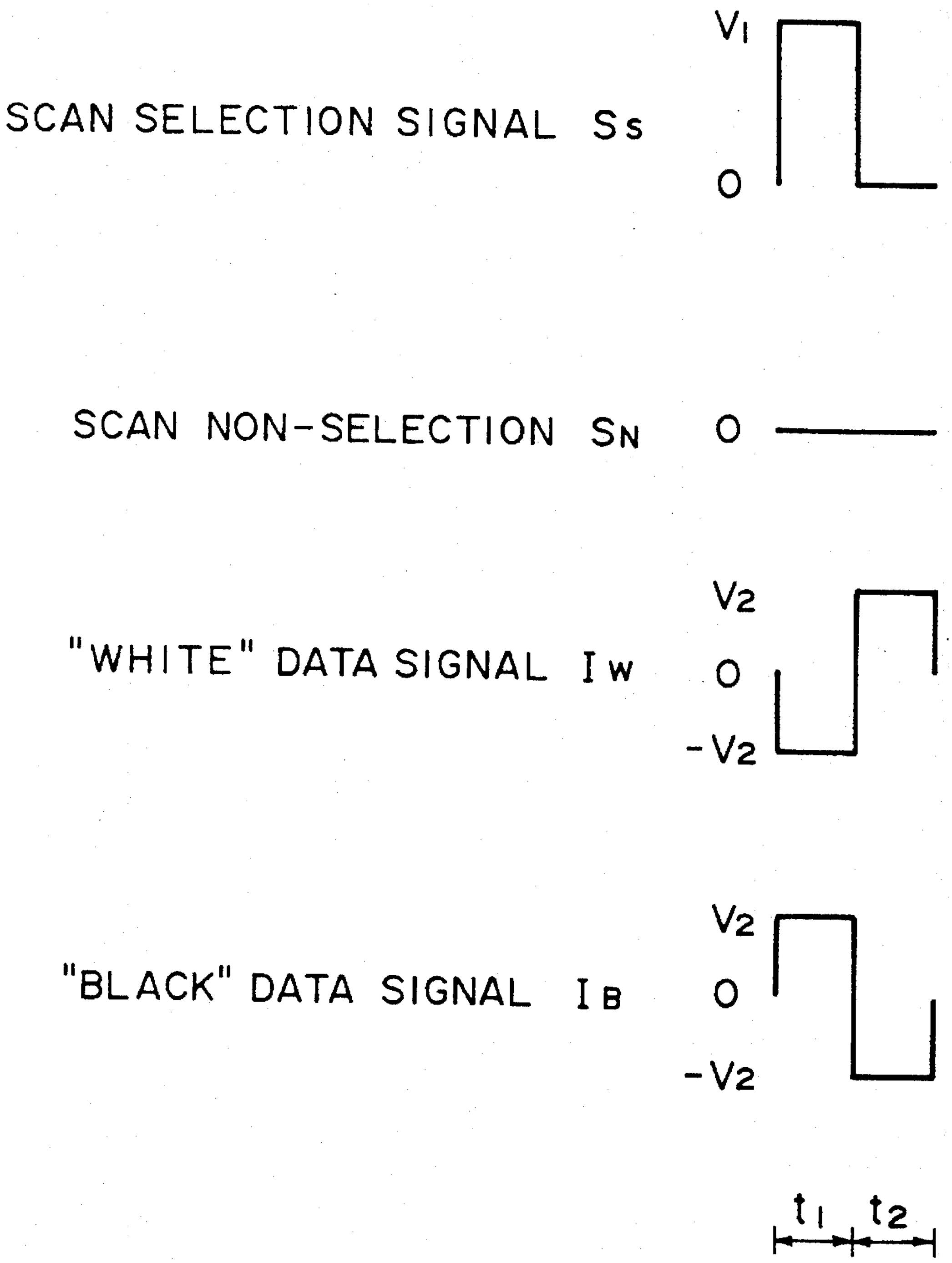
FIGS. 7A and 7B show another set of driving waveform diagrams used in the invention.
Figure 7B:
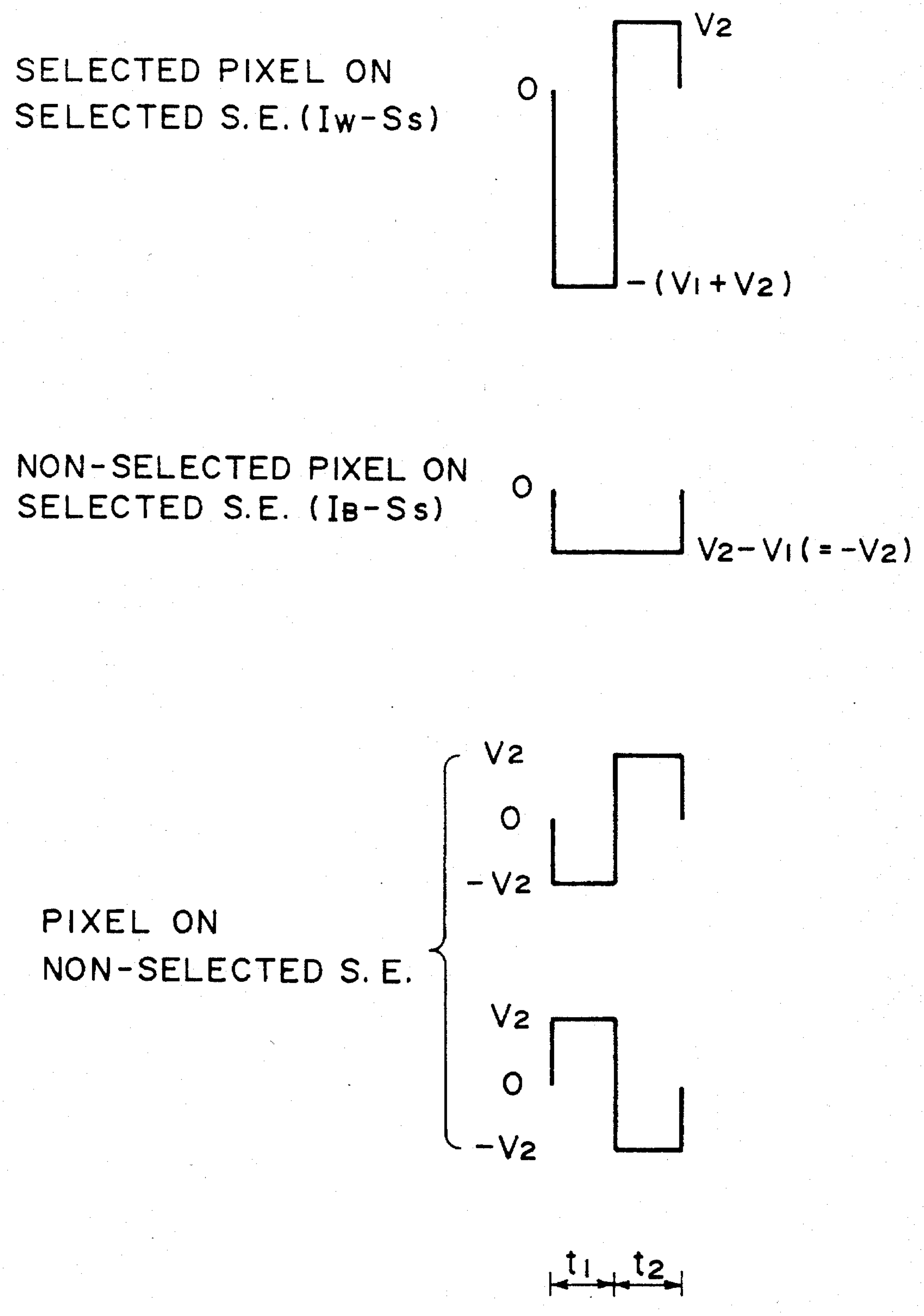

FIGS. 7A and 7B show a set of driving waveforms in another embodiment. More specifically, FIG. 7A shows a scanning selection signal $S_S$, a scanning non-selection signal $S_N$, a white data signal $I_W$ and a black data signal $I_B$. FIG. 4B shows a voltage waveform ($I_W-S_S$) applied to a selected pixel (receiving a white data signal $I_W$) among the pixels (intersections between scanning electrodes and data electrodes) on a selected scanning electrode receiving a scanning selection signal $S_S$, a voltage waveform ($I_B-S_S$) applied to a non-selected signal (receiving a black data signal $I_B$) on the same selected scanning electrode, and voltage waveforms applied to two types of pixels on non-selected scanning electrodes receiving a scanning non-selection signal $S_N$.

In this embodiment, prior to application of the above-mentioned scanning selection signal $S_S$, the scanning electrodes are supplied with a clearing voltage signal $V_H$ which has a polarity opposite to that of the scanning selection signal $S_S$ (with respect to the voltage level of a non-selected scanning electrode) and has a voltage exceeding one threshold voltage of a ferroelectric liquid crystal, whereby the related pixels are oriented in advance to one orientation state of the ferroelectric liquid crystal to form a dark state, thus effecting a step of clearing into a "black" state. In this instance, it is also possible to adopt a step of clearing into a "white" state based on a bright state. In this embodiment, however, the clearing step into black is adopted because of less occurrence of flicker.

According to FIGS. 7A and 7B, in a phase $t_1$, a selected pixel on a selected scanning electrode is supplied with a voltage $-(V_1+V_2)$ exceeding the other threshold voltage of the ferroelectric liquid crystal to result in a bright state based on the other orientation state of the ferroelectric liquid crystal, thus being written in "white". In this phase $t_1$, a non-selected pixel on the selected scanning electrode is supplied with a voltage $(-V_1+V_2)$ below the threshold voltages of the ferroelectric liquid crystal so that the orientation state of the ferroelectric liquid crystal is not changed thereby. On the other hand, the pixels on the non-selected scanning electrodes are supplied with voltages $\pm V_2$ which are below the threshold voltages of the ferroelectric liquid crystal in the phase $t_1$. As a result, in this embodiment, the pixels on the selected scanning electrode are written in either "white" or "black", and the resultant states are retained even under subsequent application of scanning non-selection signals.

Further, in phase $t_2$ of this embodiment, voltages of polarities opposite to those of the data signals in phase $t_1$ are applied through the data electrodes. As a result, the pixels at the time of non-selection are supplied with an AC voltage so that the threshold characteristic of the ferroelectric liquid crystal can be improved.

Figure 7C:
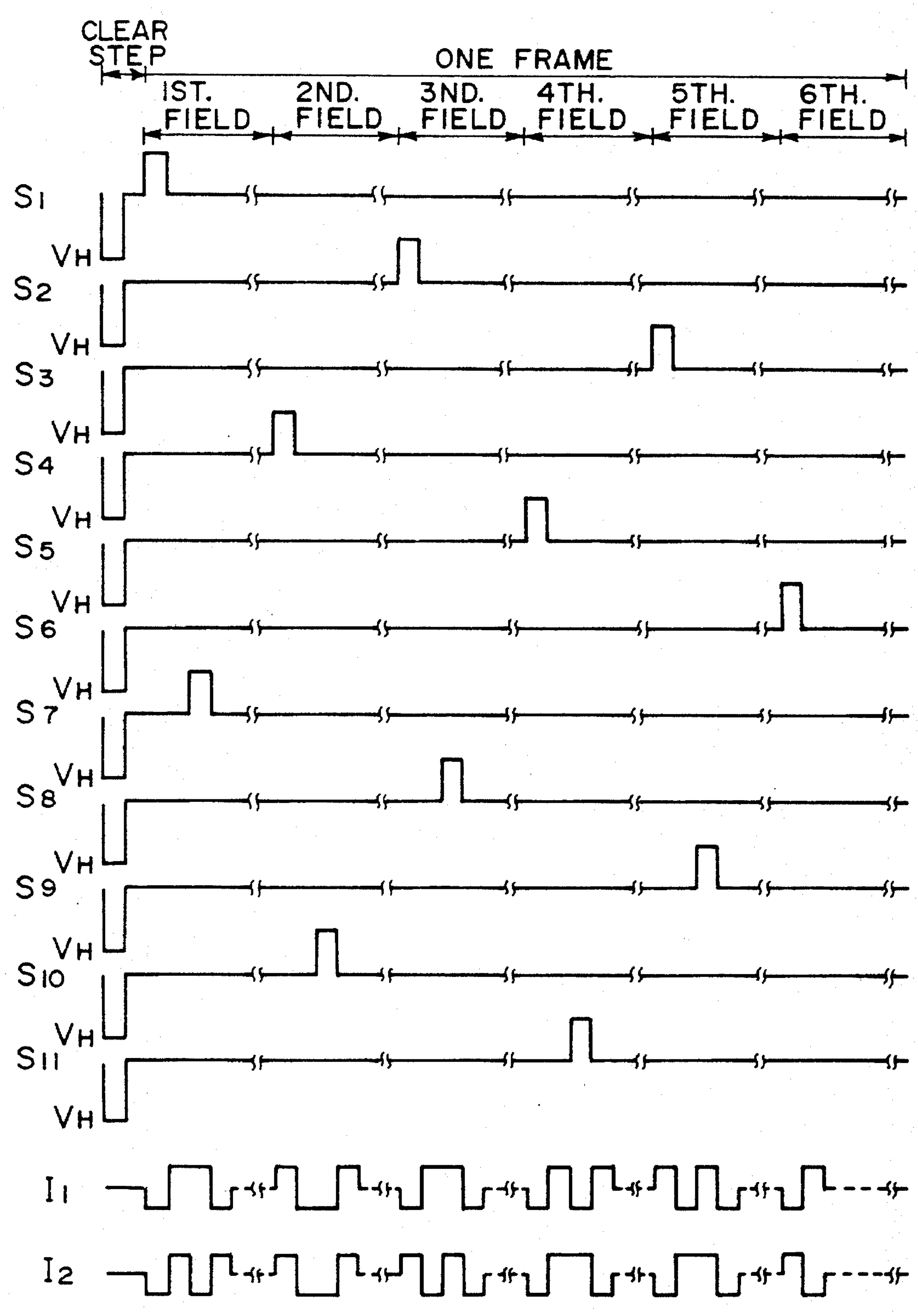
FIGS. 7C–7E are respectively a time-serial waveform diagram showing an embodiment of drive scheme using the set of waveforms shown in FIGS. 7A and 7B.

FIG. 7C is a time for providing a display state shown in FIG. 5 by using the driving waveforms shown in FIGS. 7A and 7B. In this embodiment, in a clearing step prior to application of the scanning selection signal, a clearing voltage $V_H$ is applied to the scanning electrodes, and then the scanning selection signal is applied to the scanning electrodes (with skipping of) 5 lines apart so that the scanning selection is applied to scanning electrodes which are not adjacent to each other in consecutive 6 fields. In other words, in this embodiment, the scanning electrodes are selected 5 lines apart so that one frame scanning (one picture scanning) is effected in 6 fields of scanning. As a result, the occurrence of flicker due to a low frame frequency drive can be remarkably suppressed at a low temperature, and also the occurrence of image flow is effectively removed.

Figure 7D:
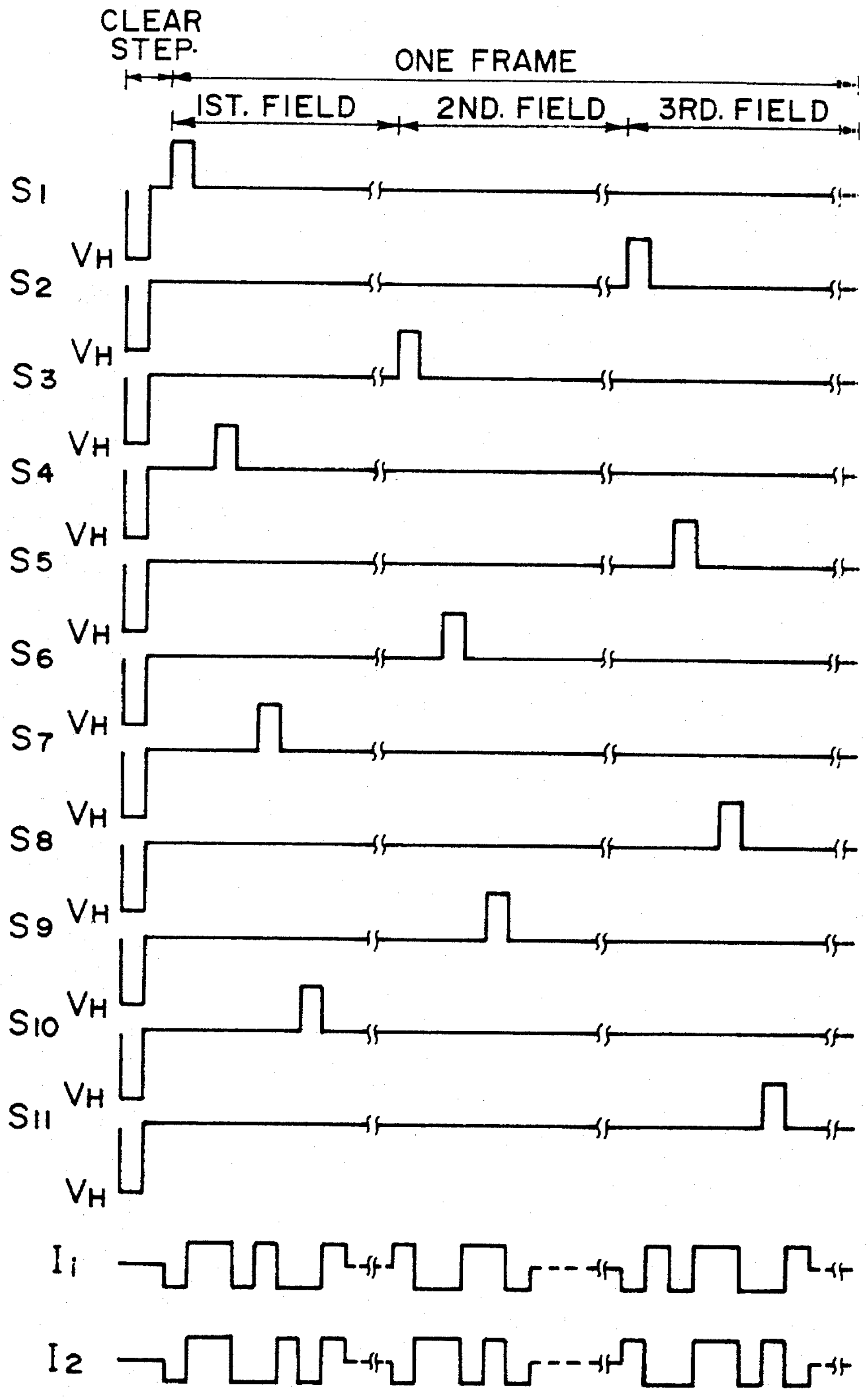

FIG. 7D shows another embodiment using the drive waveforms shown in FIGS. 7A and 7B. In this embodiment, the scanning electrodes are selected two lines apart so that not-adjacent scanning electrodes are selected in consecutive three fields of scanning.

Figure 7E:
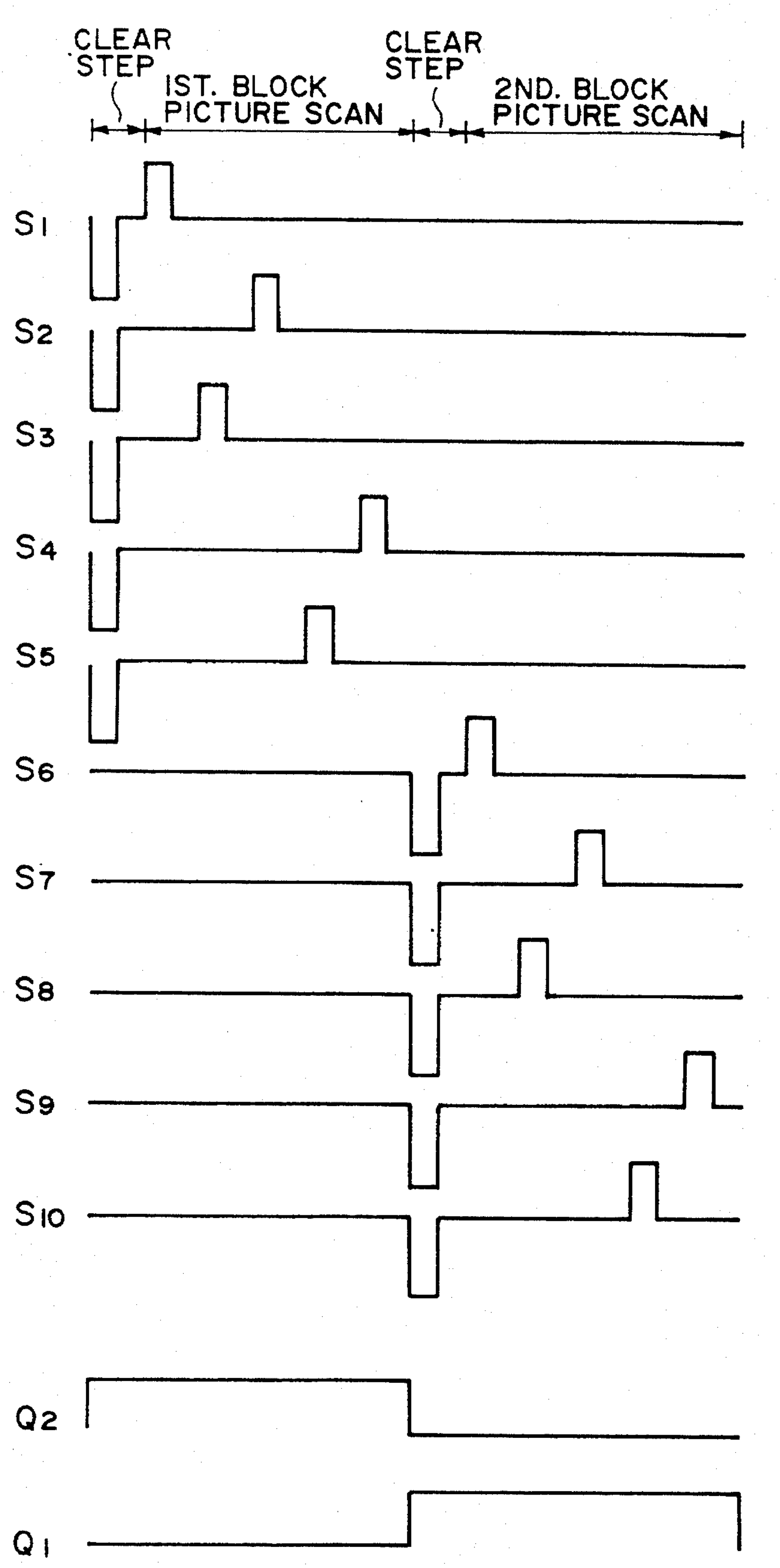
Figure 8:
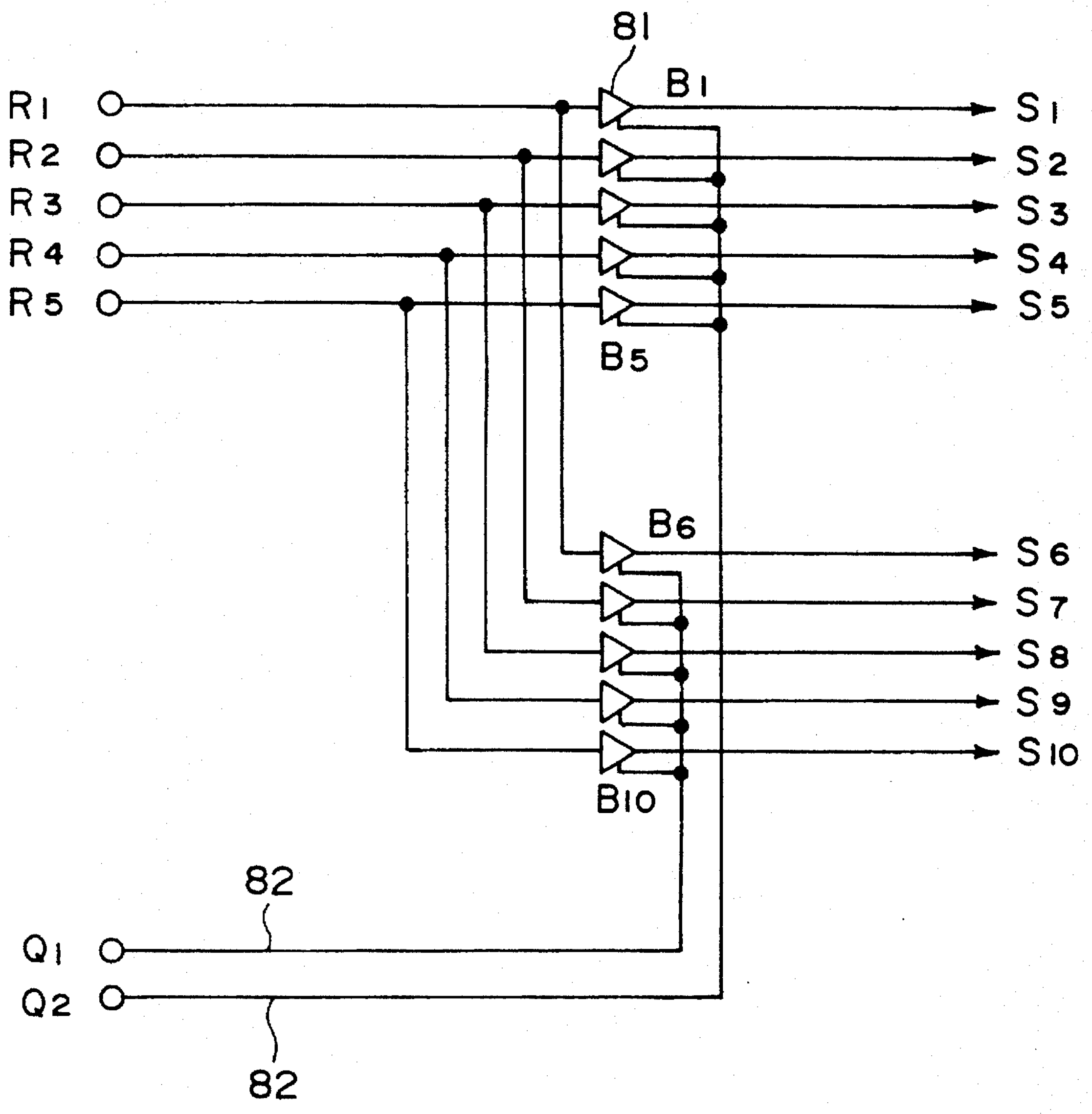
FIG. 8 is a block diagram of output means of a scanning electrode drive circuit used in the present invention.

FIG. 7E shows another embodiment using the drive waveforms shown in FIGS. 7A and 7B, wherein only scanning signals are shown along with corresponding states of terminals $Q_1$ and $Q_2$ shown in FIG. 8. According to the embodiment shown in FIG. 7E, one block is designated for 5 scanning electrodes each, and for each block, a clearing step is performed by application of a clearing voltage signal $V_H$ and then a scanning selection signal is sequentially applied to not-adjacent scanning electrodes.

FIG. 8 is a partial circuit diagram showing an output stage of a scanning electrode drive circuit for performing the drive of the above embodiment. Referring to FIG. 8, the output stage includes terminals $R_1$–$R_5$, buffers 81 ($B_1$–$B_{10}$ . . . ) connected to output lines $S_1$–$S_{10}$, and terminals $Q_1$ and $Q_2$ connected to the buffers 81 through selection lines 82. The output level of a buffer 81 is controlled by a selection line 82. When a terminal $Q_2$ is selected, buffers $B_1$–$B_5$ are simultaneously turned on so as to transfer the levels of terminals $R_1$–$R_5$ as they are to output lines $S_1$–$S_5$. If the terminal $Q_2$ is not selected, the output lines $S_1$–$S_5$ are all brought to a prescribed constant level so as to make the cells non-selective. A terminal $Q_1$ has the same function with respect to the buffers $B_6$–$B_{10}$.

Figure 9:
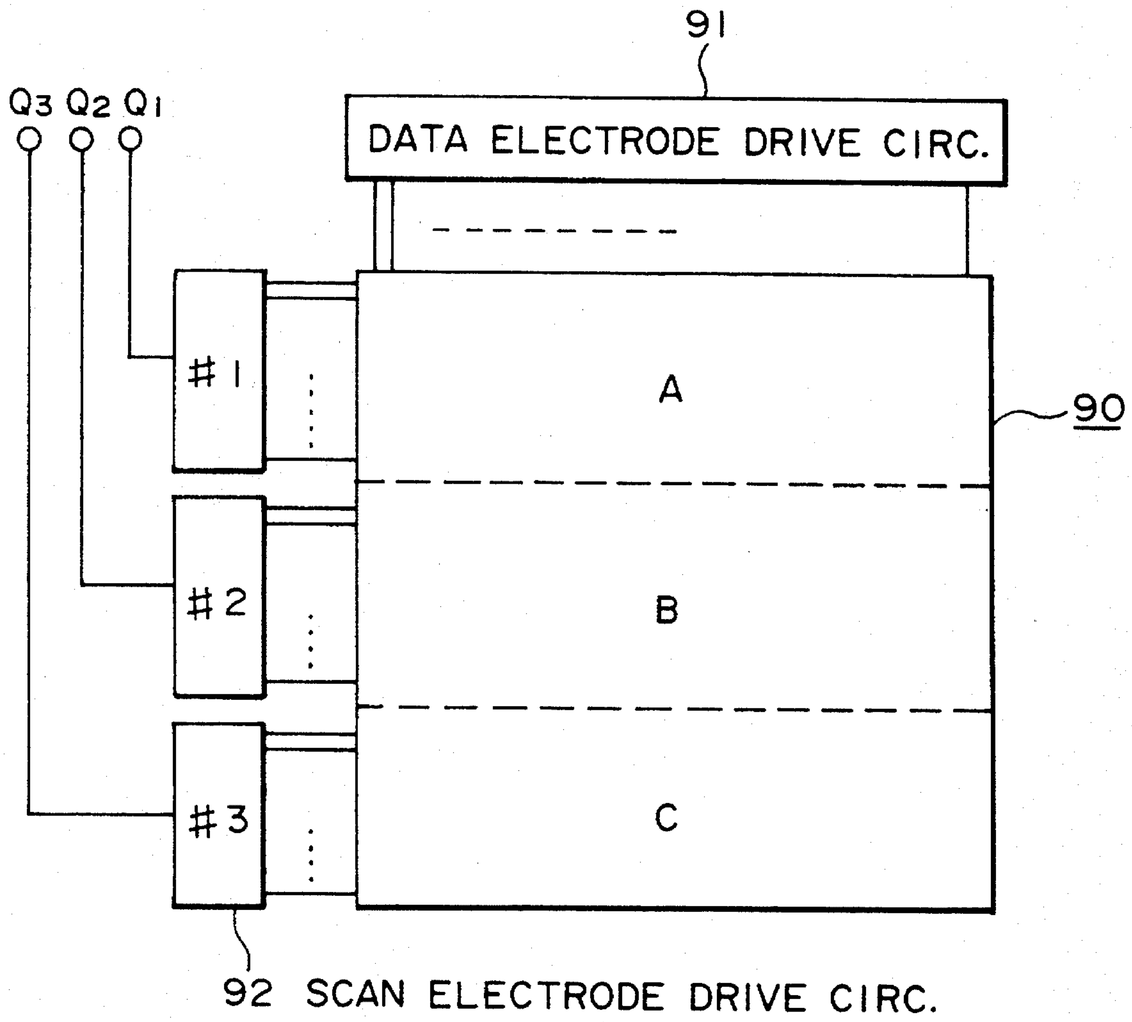
FIG. 9 is a block diagram illustrating an embodiment of the present invention.

FIG. 9 is a block diagram of a circuit for use in another embodiment of the present invention. Referring to FIG. 9, data signals are supplied to a display panel 90 through a common data electrode drive circuit 91. On the other hand, a scanning electrode drive circuit 92 is divided into three sections #1, #2 and #3 so as to control display areas A, B and C, respectively, of the display panel 90. The scanning electrode drive circuits #1–#3 are separately composed of their own logic circuits, and scanning electrodes for writing are first selected by input signals $Q_1$–$Q_3$ and used to write in the areas A, B and C separately, so that writing of a large capacity and high density can be performed at a high speed.

Figure 10A:
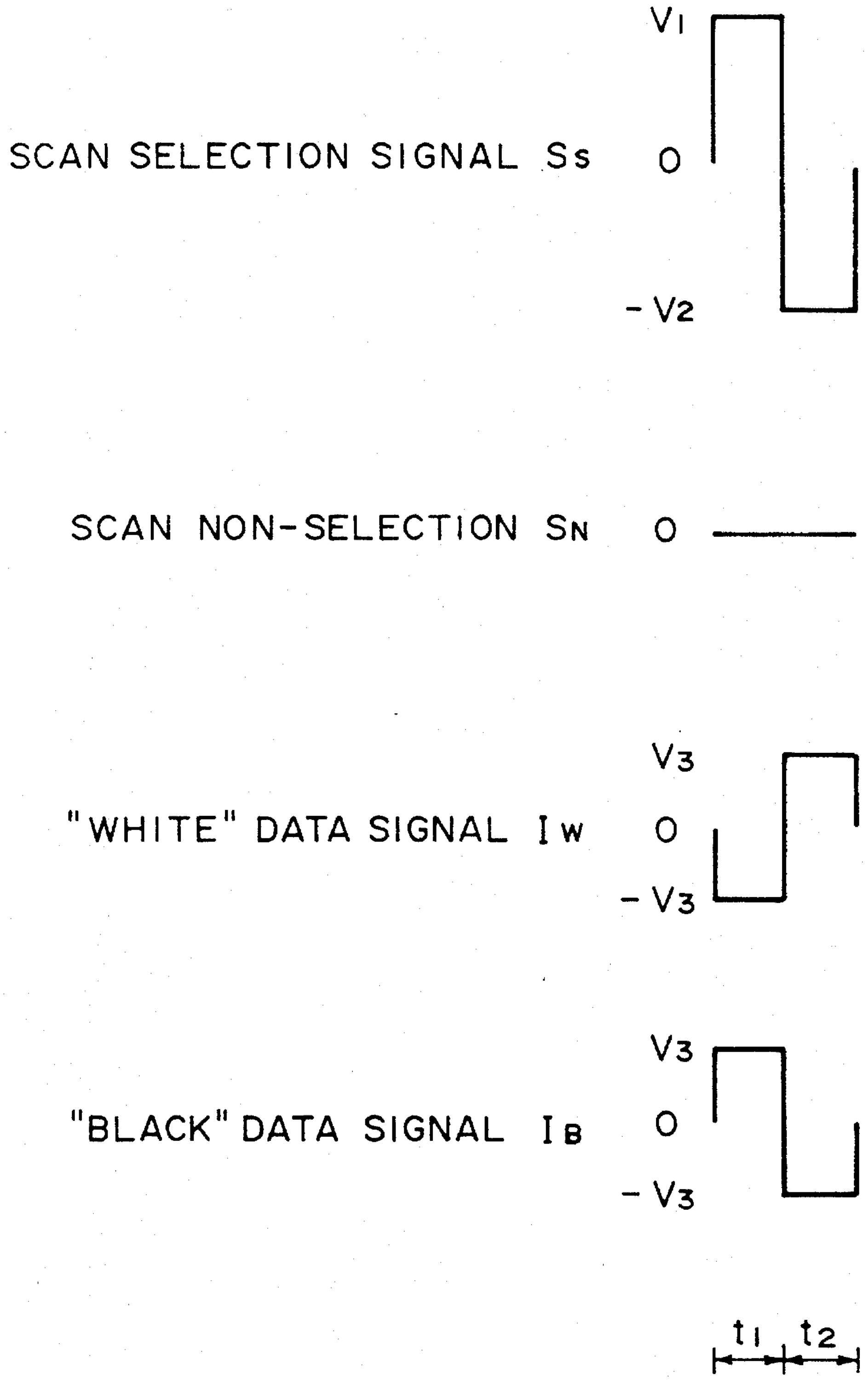
FIGS. 10A–10D, FIGS. 11A–11D, FIGS. 12A–12C and FIGS. 13A–13C, respectively, show another set of driving waveform diagrams used in the invention.
Figure 10B:
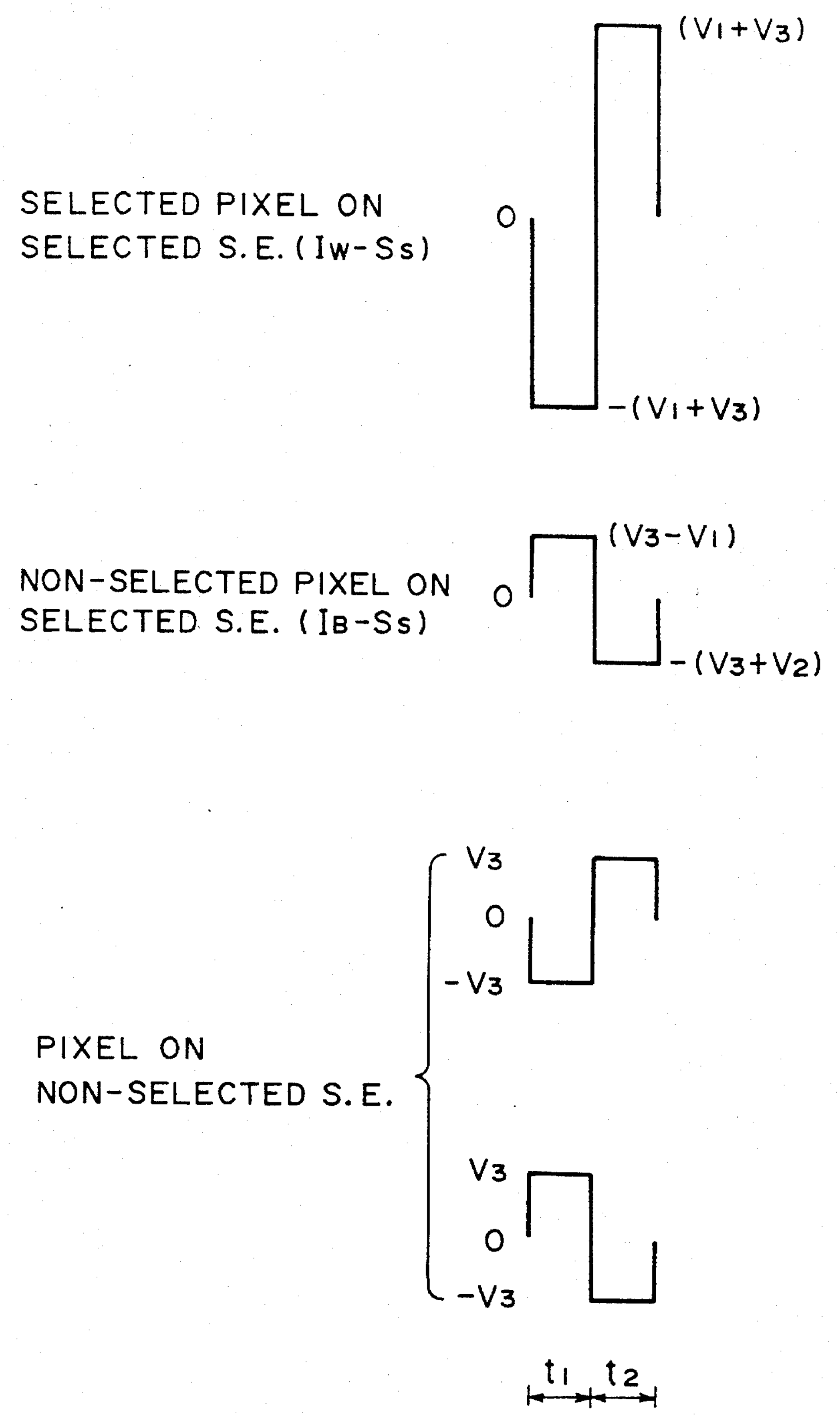

FIGS. 10A and 10B show a set of driving waveforms used in another embodiment of the present invention. Similarly as in the previous embodiment, prior to application of a scanning selection signal, a clearing voltage $V_H$ is applied, so that the whole picture area or a block thereof is cleared into "black" (or "white").

In the embodiment shown in FIGS. 10A and 10B, writing of "white" is effected in phase $t_2$. In a preceding phase $t_1$, an auxiliary signal is applied through data electrodes so as to apply an AC voltage to pixels at the time of scanning non-selection similarly as in the previous embodiment. Such an auxiliary signal shows the same effect as disclosed in U.S. Pat. No. 4,655,561, etc.

Figure 10C:
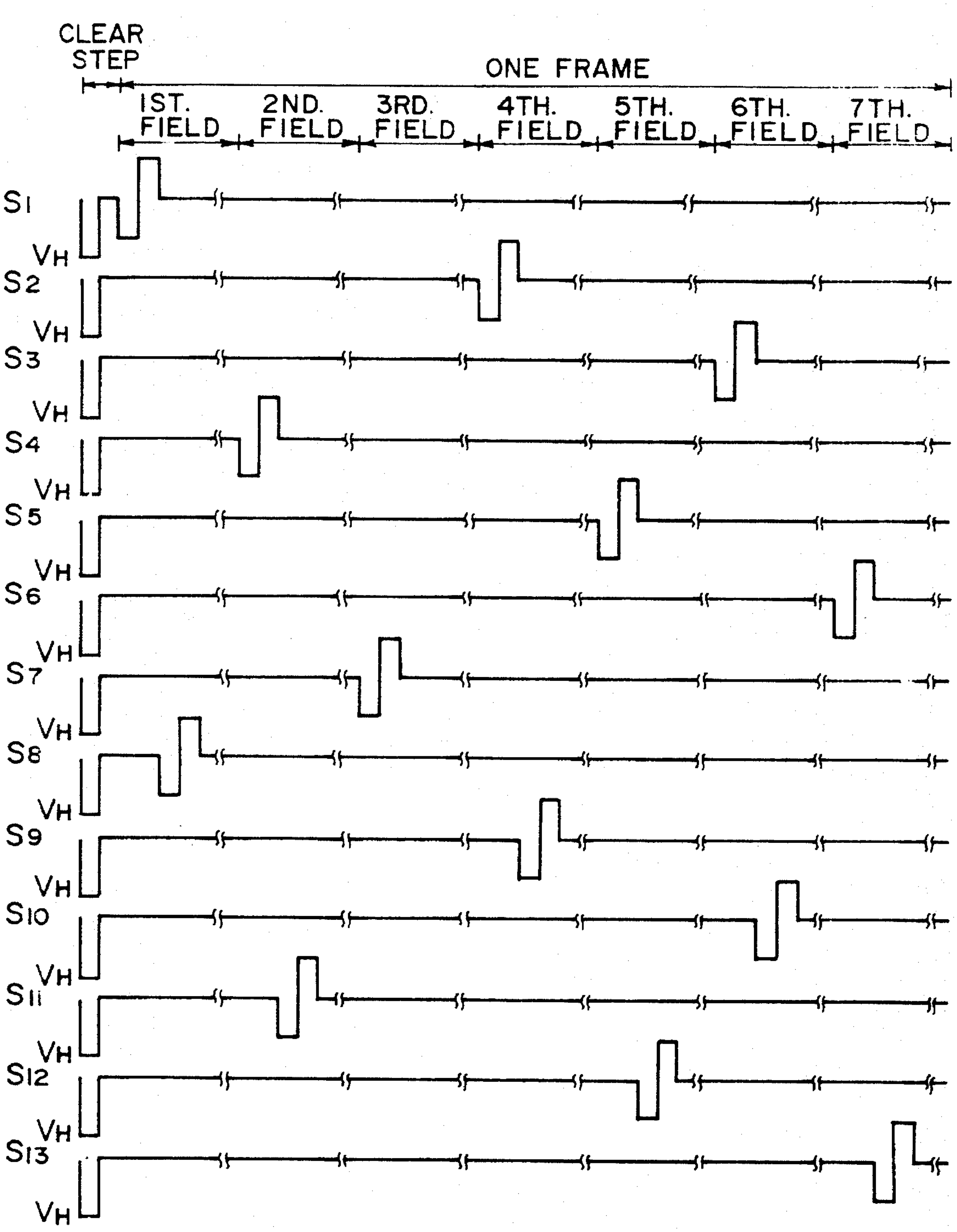

FIG. 10C is a time chart showing a time relation of applying scanning selection signals using the driving waveforms shown in FIGS. 10A and 10B, wherein only scanning selection signals are shown. According to the driving embodiment shown in FIG. 10C, a scanning selection signal is applied to the scanning electrodes with skipping of 6 lines apart so that one frame scanning is completed in 7 fields of scanning. Also in this embodiment, the scanning selection signal is applied to scanning electrodes which are not adjacent to each other in consecutive 7 fields of scanning.

The present invention is not limited to the above embodiment and particularly, a scanning selection signal may be applied to 4 or more lines apart, preferably 5–20 lines apart.

Figure 10D:
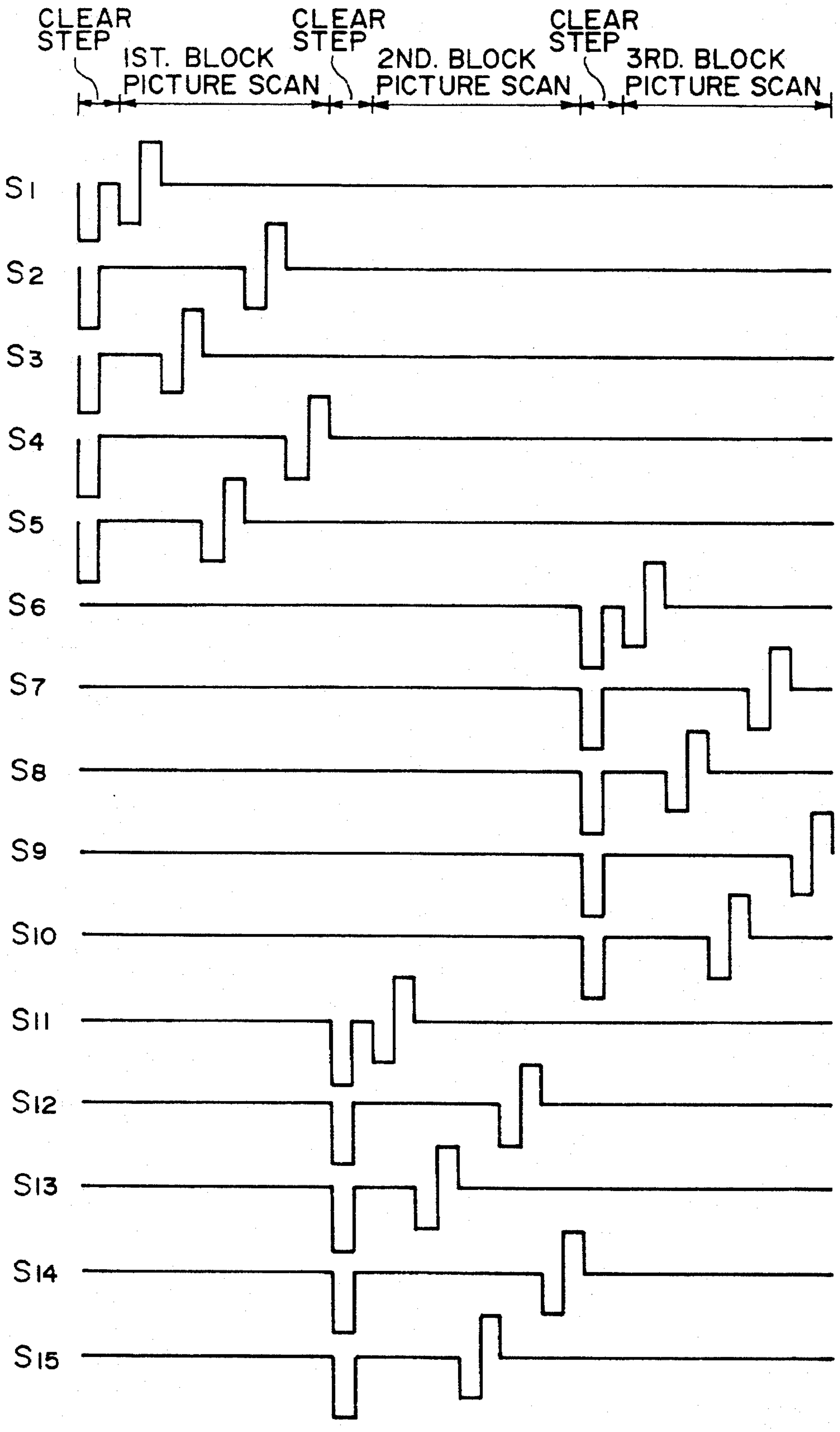

FIG. 10D shows another embodiment using the driving waveforms shown in FIGS. 10A and 10B, wherein only scanning signals are shown. According to the embodiment shown in FIG. 10D, one block is designated for each 5 scanning electrodes, and for each block, a clearing step is performed by applying a clearing voltage signal $V_H$, followed by sequential application of a scanning selection signal to scanning electrodes which are not adjacent to each other. Further, in this embodiment, one picture scanning is performed by sequentially effecting block scanning operations for blocks which are not adjacent to each other.

In the above embodiments shown in FIGS. 7A–7E and FIGS. 10A–10D, it is preferred that the following conditions are satisfied. The peak values of the voltage signals $V_H$, $V_1$ and $\pm V_2$ in FIGS. 7A–7E may preferably be set to satisfy the relations of: $|V_H| \geqq |V_1+V_2|$, and $|V_1|>|\pm V_2|$, particularly $|V_1| \geqq 2|\pm V_2|$. The peak values of the voltage signals $V_H$, $V_1$, $-V_2$ and $\pm V_3$ may preferably be set to satisfy the relations of: $|V_H| \geqq |V_1+V_3|$, and $|V_1|=|-V_2|>|\pm V_3|$, particularly $|V_1|=|-V_2| \geqq |2\pm V_3|$. Further, the pulse durations of these voltage signals in FIGS. 7 and 10 may be set to 1 μsec–1 msec, preferably 10 μsec–100 μsec and it is preferred to set a longer pulse duration at a lower temperature than at a high temperature.

Figure 11A:
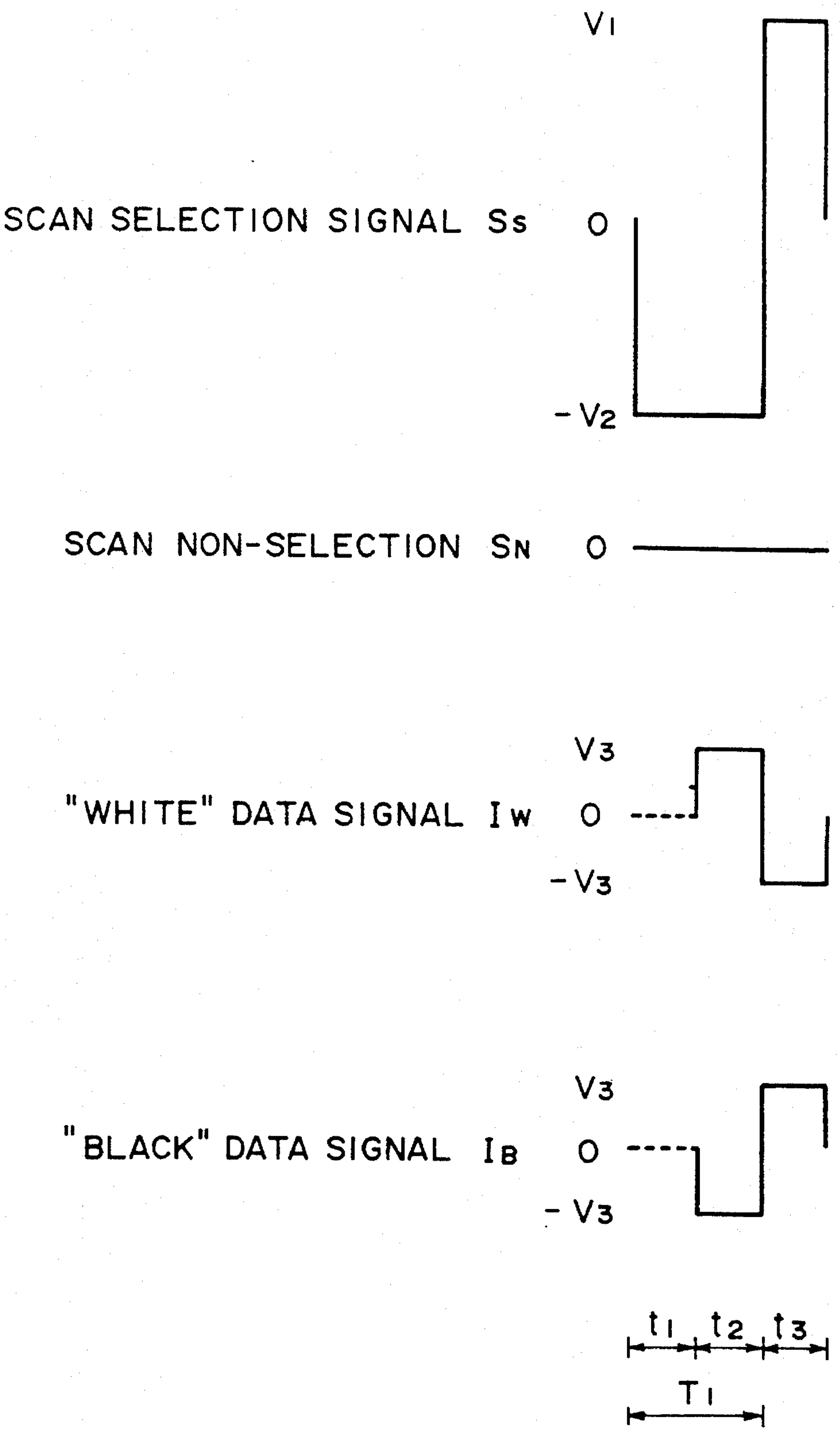
Figure 11B:
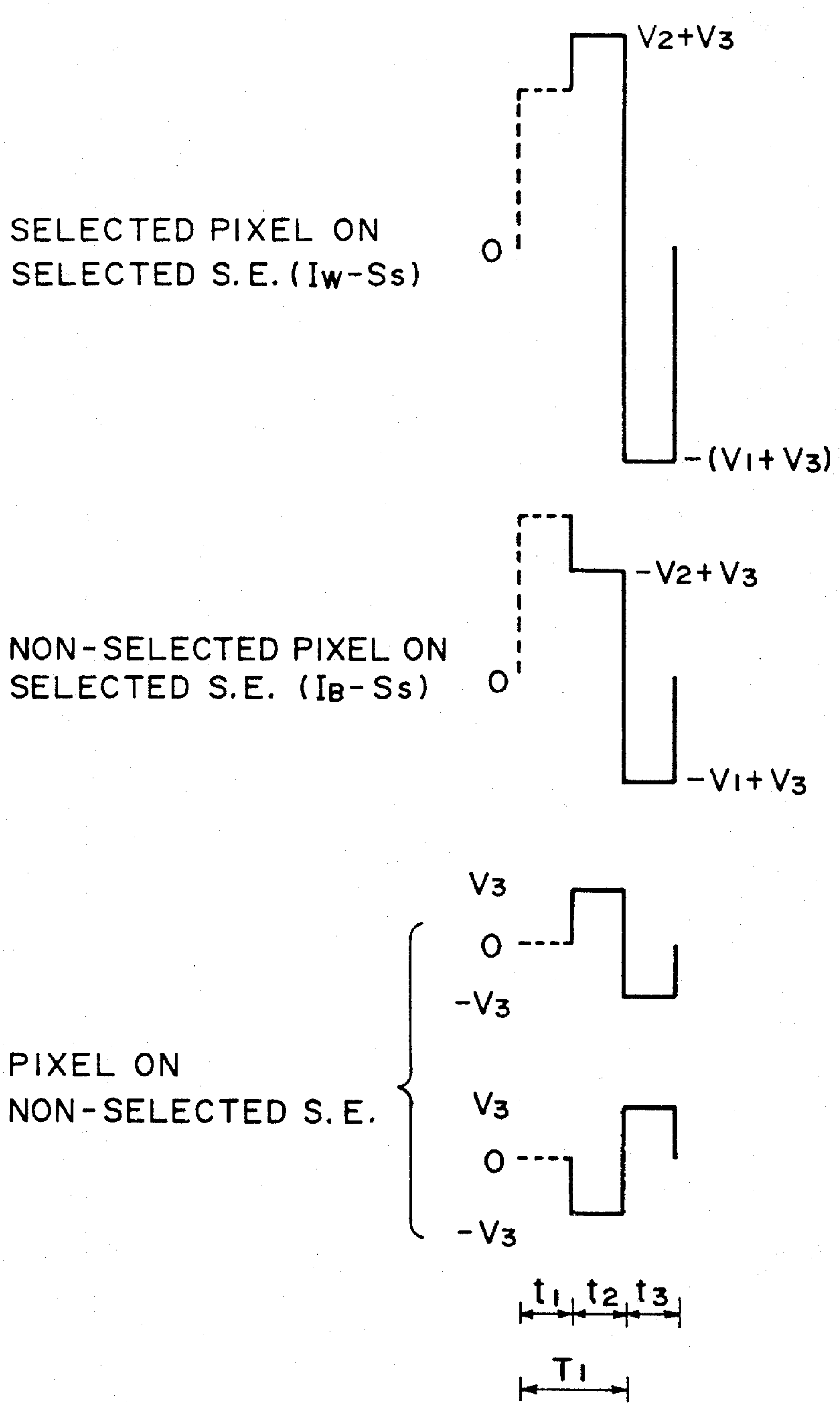

FIG. 11A shows a scanning selection signal $S_S$, a scanning non-selection signal $S_N$, a white data signal $I_W$ and a black data signal $I_B$ in another embodiment of the present invention. FIG. 11B shows a voltage waveform ($I_W$–$S_S$) applied to a selected pixel (receiving a white data signal $I_W$) among the pixels (intersections between scanning electrodes and data electrodes) on a selected scanning electrode receiving a scanning selection signal $S_S$, a voltage waveform ($I_B$–$S_S$) applied to a non-selected signal (receiving a black data signal $I_B$) on the same selected scanning electrode, and voltage waveforms applied to two types of pixels on non-selected scanning electrodes receiving a scanning non-selection signal $S_N$. According to the embodiment shown in FIGS. 11A and 11B, a phase $T_1$ is used for causing one orientation state of a ferroelectric liquid crystal regardless of the types of data pulses. In this embodiment, cross nicol polarizers are set so as to provide a black display based on a dark state when the ferroelectric liquid crystal assumes one orientation state, but it is also possible to set the polarizers so as to provide a bright state corresponding to one orientation state. Further, a former (sub-)phase $t_1$ in the phase $T_1$ is used as a phase for applying a part of a data signal applied in association with a previous scanning selection signal. In phase $t_3$, a selected pixel on a selected scanning electrode receiving a scanning selection signal $S_S$ is supplied with a voltage $-(V_1+V_3)$ to result in the other orientation state of the ferroelectric liquid crystal, whereby a white display based on a bright state is given after clearing into a "black" display in the phase $T_1$. On the other hand, another pixel (non-selected pixel) on the selected scanning electrode is supplied with a voltage $-(V_1-V_3)$ which however is set to a voltage not changing the orientation state of the ferroelectric liquid crystal, so that the black display state resultant in the phase $T_1$ is retained in the phase $t_3$. Further, the pixels on the non-selected scanning electrodes receiving a scanning non-selection signal are supplied with voltages $\pm V_3$ not changing the orientation states of the ferroelectric liquid crystal. As a result, because of the memory effect of the ferroelectric liquid crystal, the written states are retained as they are during one field or frame scanning period.

Further, in phase $t_2$ of this embodiment, voltages having polarities opposite to those of the data pulses in the writing phase $t_3$ are applied through the data electrodes. As a result, as shown at the lower part of FIG. 11B, the pixels on the non-selected scanning electrodes are supplied with an AC voltage, so that the threshold characteristic of the ferroelectric liquid crystal is improved.

Figure 11C:
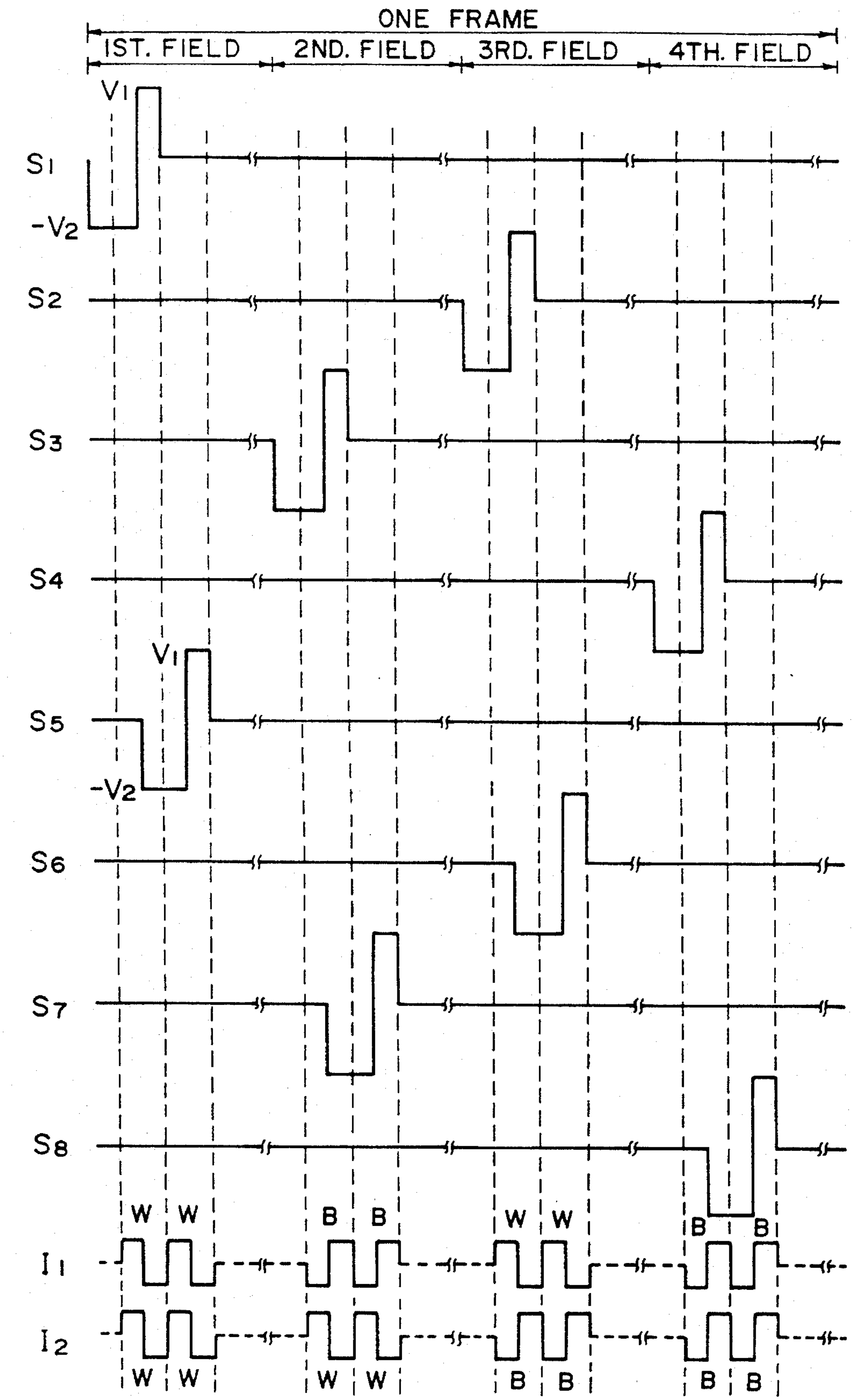

FIG. 11C is a time chart of a set of voltage waveforms providing a display state as shown in FIG. 5 with respect to scanning electrodes $S_1$–$S_8$. In this embodiment, a scanning selection signal is applied to the scanning electrodes with skipping of 3 lines apart in a field and the scanning selection signal is applied to scanning electrodes which are not adjacent to each other in consecutive 4 fields. In other words, in this embodiment, the scanning electrodes are selected 3 lines apart, so that one frame scanning (one picture scanning) is performed in 4 fields of scanning. As a result, the occurrence of a flicker attributable to a low frame frequency drive can be remarkably suppressed even at a lower temperature requiring a longer scanning selection period ($t_1$+$t_2$+$t_3$)) and accordingly under a scanning drive at a low frame frequency (of, e.g., 5–10 Hz). Further, as not-adjacent scanning electrodes are selected in consecutive 4 fields of scanning, image flow is effectively removed.

Figure 11D:
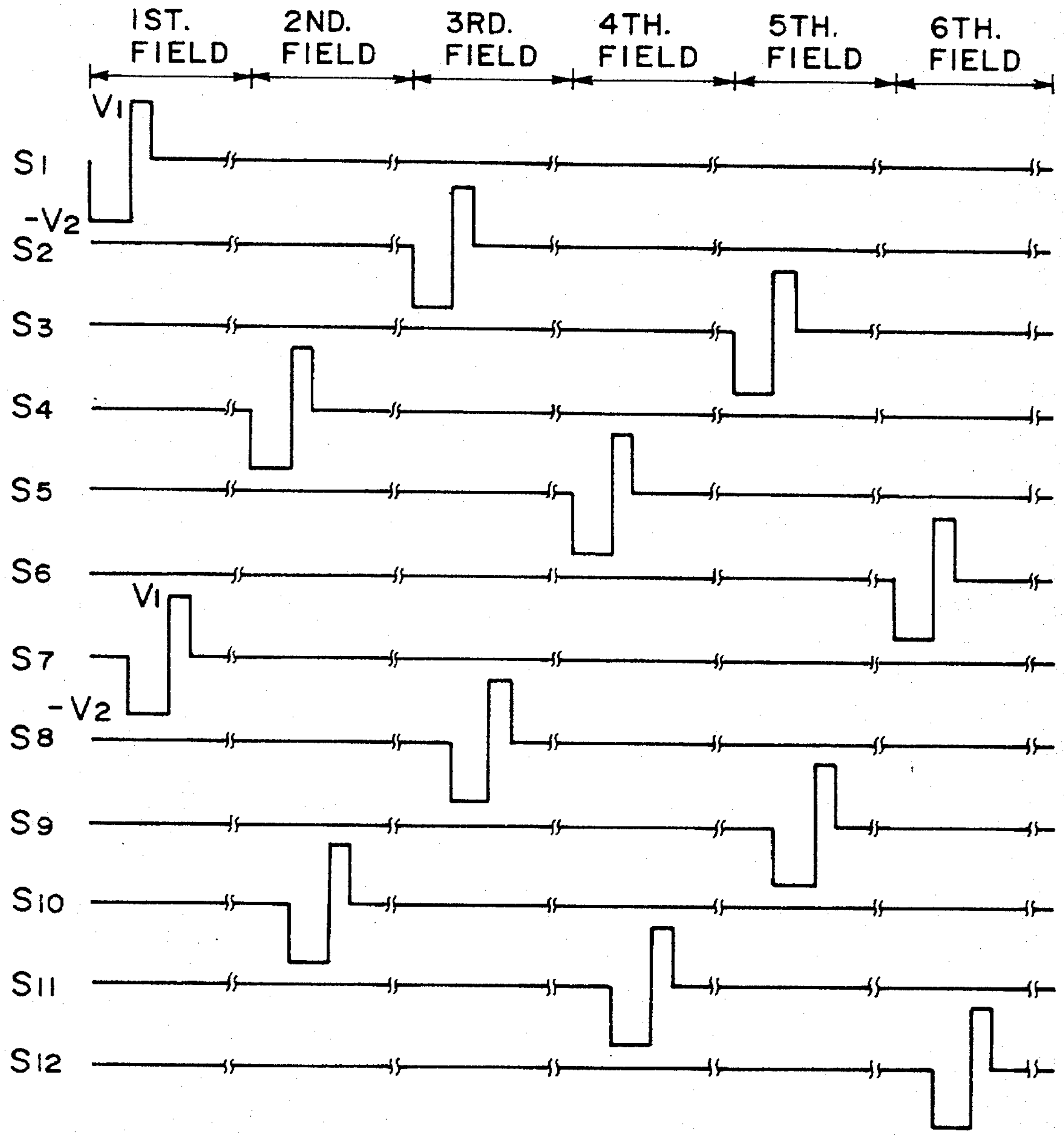

FIG. 11D shows another embodiment using drive waveforms shown in FIG. 11A. In this embodiment, the scanning electrodes are selected 5 lines apart so that not-adjacent scanning electrodes are selected in consecutive 6 fields of scanning.

In the embodiments shown in FIGS. 11C and 11D, with respect to two successively applied scanning selection signals each having a former pulse (voltage: $-V_2$) and a latter pulse (voltage: $V_1$), the former pulse ($-V_2$) of a succeeding scanning selection signal is applied simultaneously with the latter pulse ($V_1$) of a previous scanning selection signal. Further, in these embodiments, the scanning pulses and data pulses are set to satisfy the relationships of $|V_1|=|-V_2|=3|\pm V_3|$ and $t_1=t_2=t_3$. These relationships are not necessarily essential, but for example, a relationship of $|V_1|=|-V_2|=a|\pm V_3|$ ($a \geqq 2$) may be applicable.

Figure 12A:
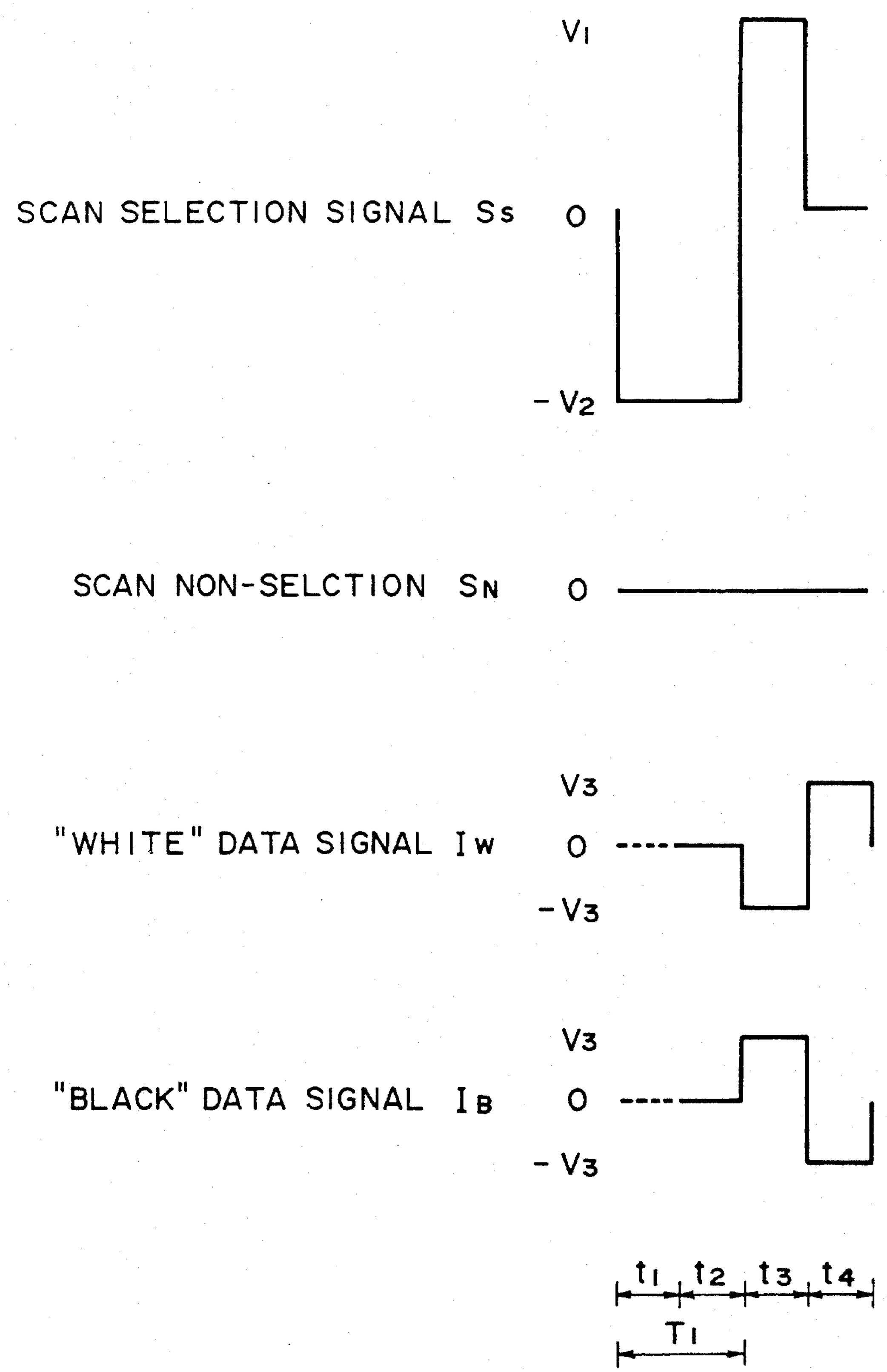
Figure 12B:
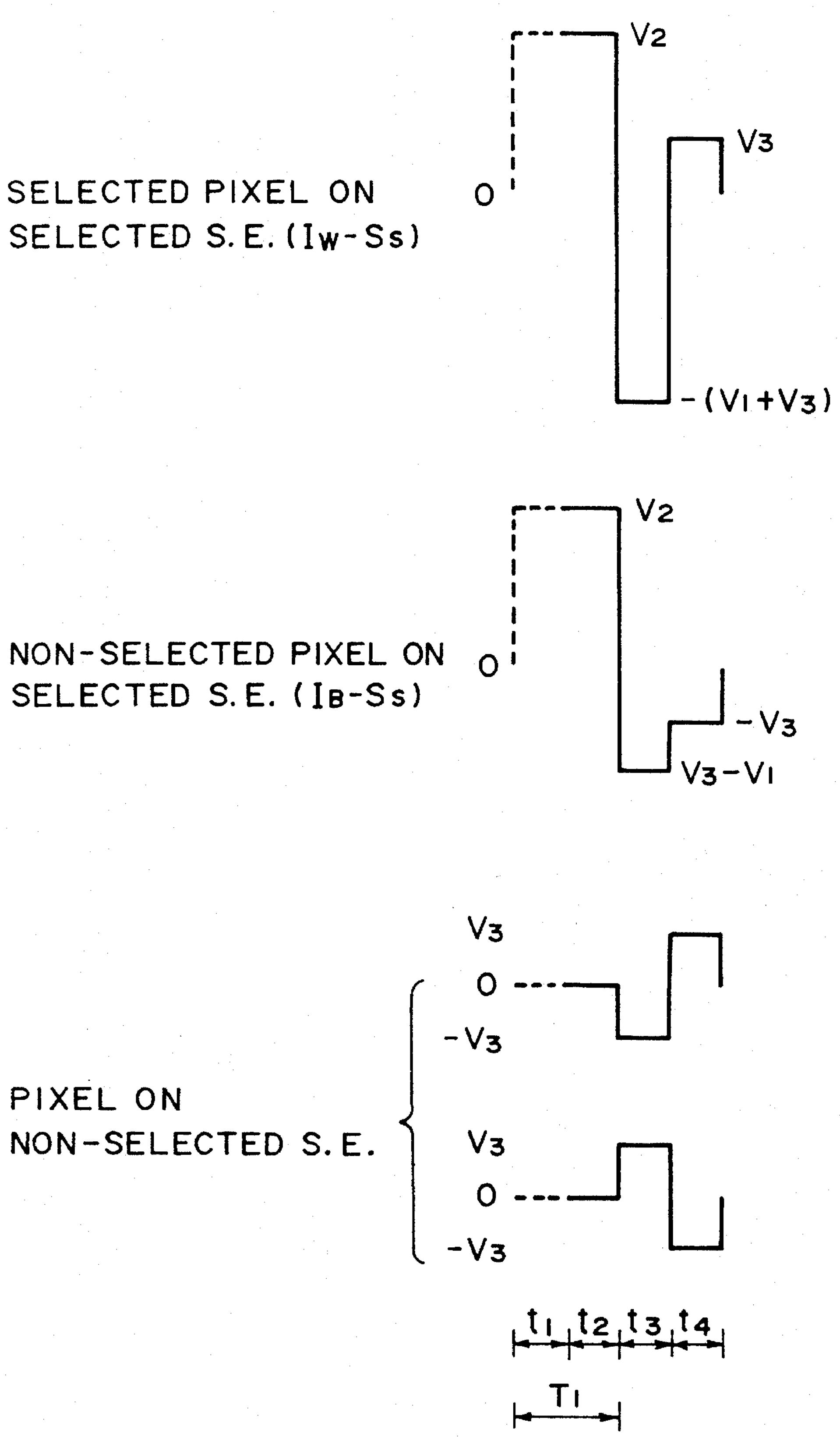

FIGS. 12A and 12B show a set of driving waveforms used in another driving embodiment. According to the embodiment shown in FIGS. 12A and 12B, all or a prescribed number of the pixels on a selected scanning electrode are cleared into "black" in phase $T_1$ regardless of the types of data signals concerned, and in writing phase $t_3$, a selected pixel among the pixels is supplied with a voltage providing a white display and the other pixels among the pixels are supplied with a voltage maintaining the black display. Phase $t_4$ is a phase for applying auxiliary signals through the data electrodes so as to always apply an AC voltage to the pixels at the time of non-selection, and these auxiliary signals correspond to a part of data signals for previous data entry applied in phase $t_1$. The effect of application of such an auxiliary signal has been classified, e.g., in U.S. Pat. No. 4,655,561.

Figure 12C:
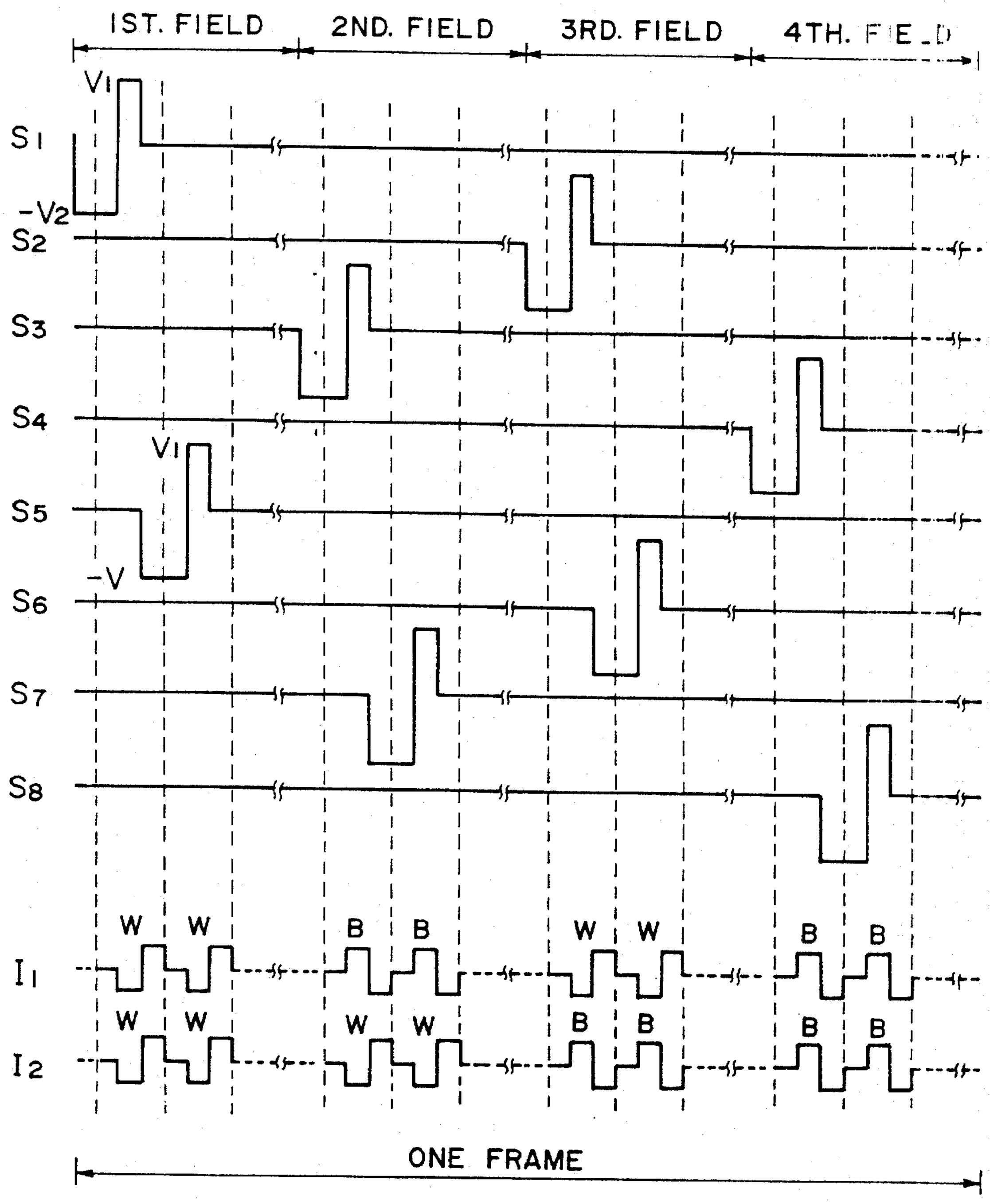

FIG. 12C is a time chart of a set of voltage waveforms using those shown in FIGS. 12A and 12B for providing a display state as shown in FIG. 5, with respect to scanning electrodes $S_1$–$S_8$. In this embodiment, a scanning selection signal is applied to the scanning electrodes with skipping of 3 lines apart and one frame scanning is completed by 4 fields of scanning. Also in this embodiment, the scanning selection signal is applied to scanning electrodes which are not adjacent to each other in four scanning fields. Further, in the embodiment shown in FIG. 12C, with respect to two successively applied scanning selection signals, a former pulse (voltage: $-V_2$) of a subsequent scanning selection signal is applied immediately after application of a latter pulse (voltage: $V_1$) of a preceding scanning selection signal.

Figure 13A:
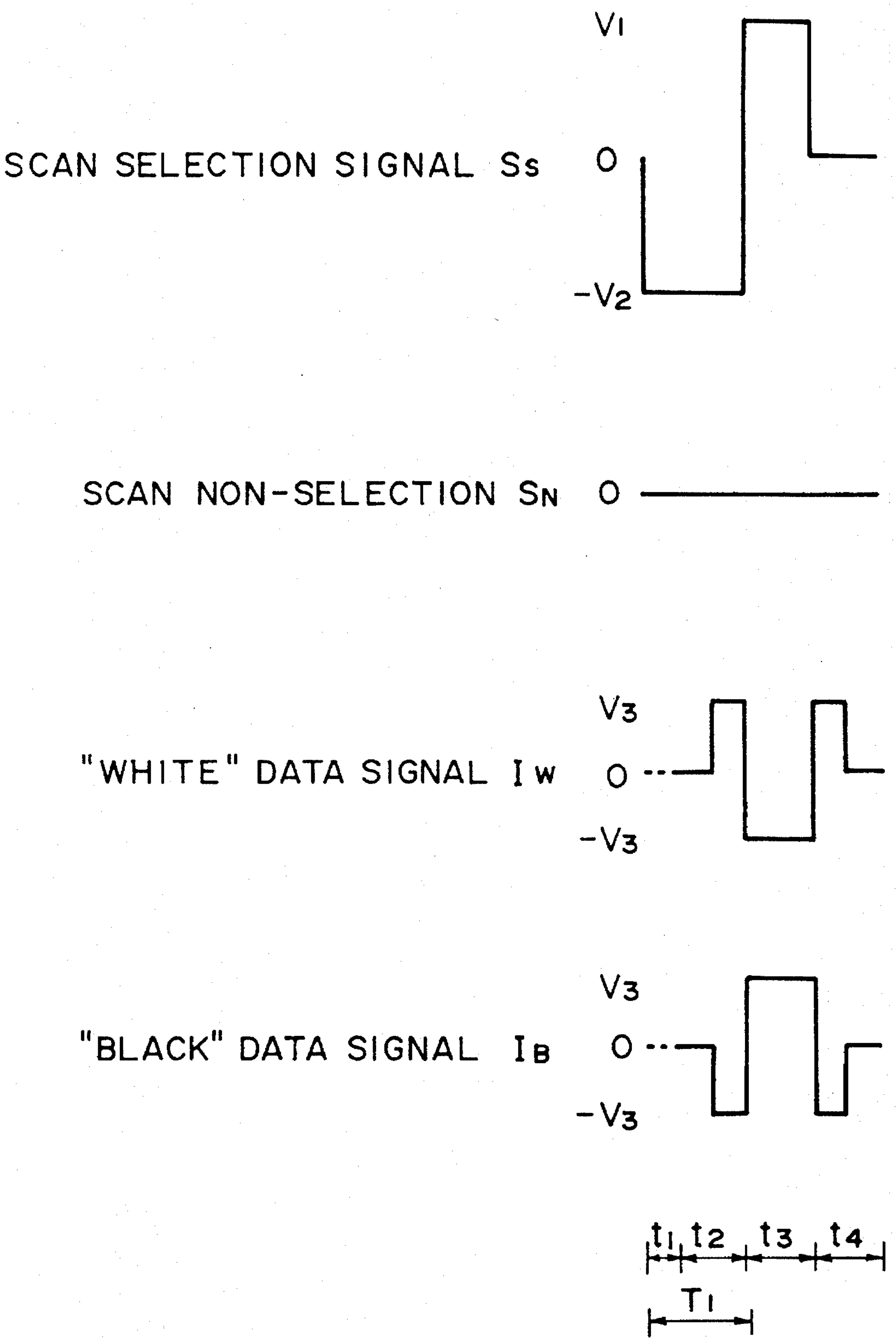
Figure 13B:
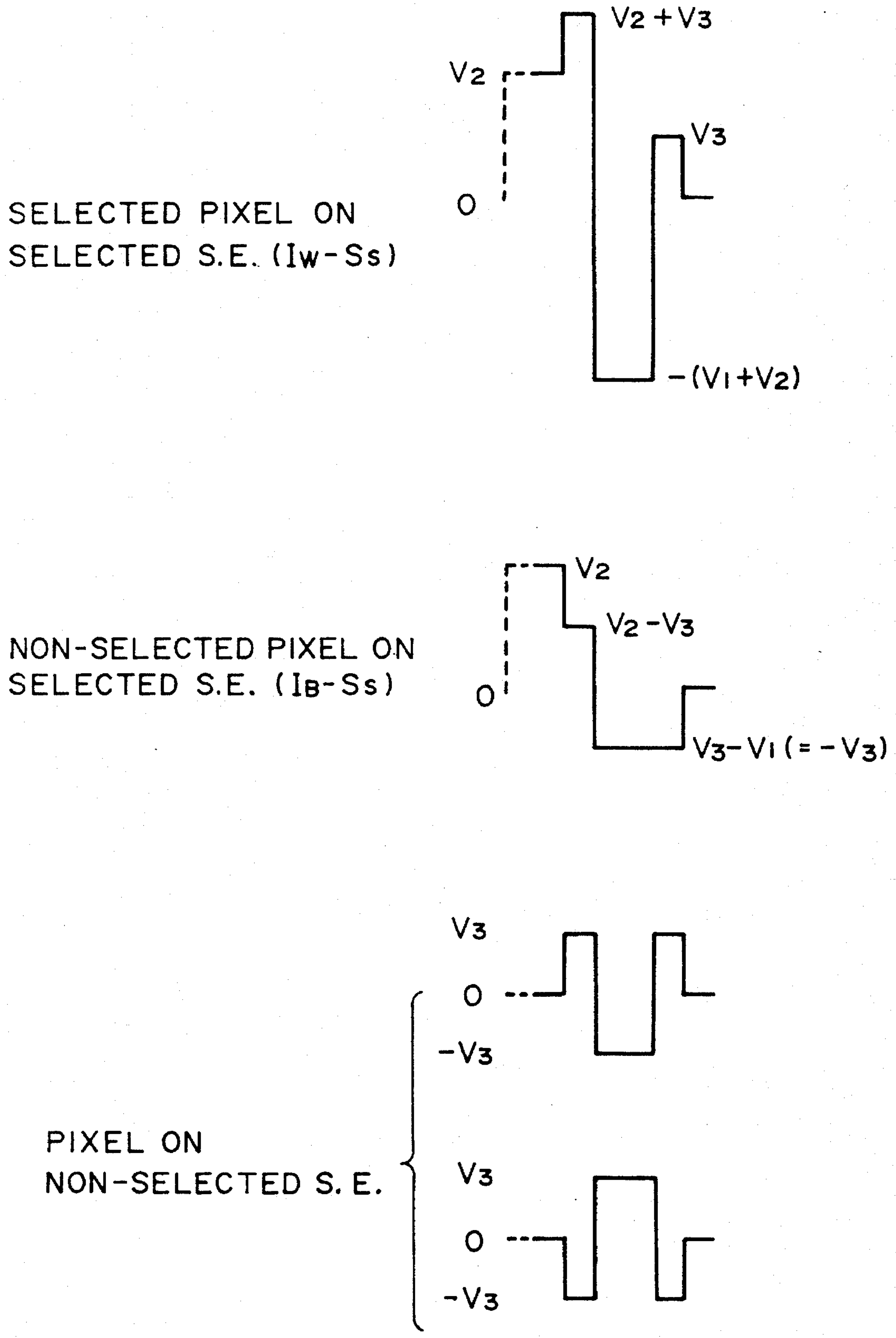

FIGS. 13A and 13B show a set of driving waveforms used in another embodiment. Phase $T_1$ is a clearing phase similar to the one in the previous embodiment and phase $t_3$ is a writing phase similar to the one in the previous embodiment. Phases $t_2$ and $t_4$ correspond to phases for applying auxiliary signals used in the previous embodiment so as to always apply AC voltages to pixels at the time of non-selection, whereby the threshold characteristic of the ferroelectric liquid crystal is improved. Further, phase $t_1$ is also used for applying a part of a data signal associated with a previous scanning selection signal.

Figure 13C:
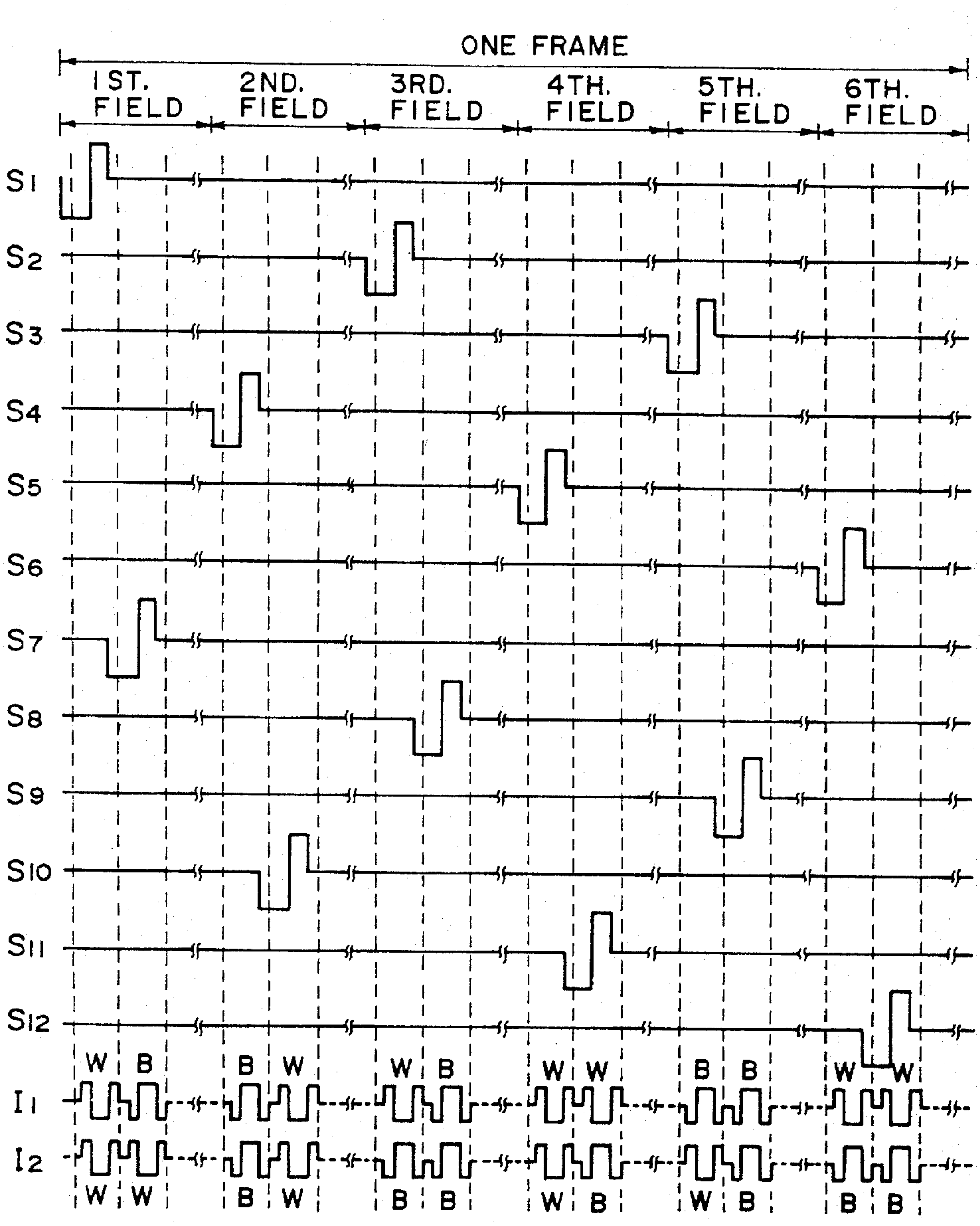

FIG. 13C is a time chart of a set of voltage waveforms using those shown in FIGS. 13A and 13B for providing a display state as shown in FIG. 5, with respect to scanning electrodes $S_1$–$S_{12}$. In this embodiment, a scanning selection signal is applied to the scanning electrodes with skipping of 5 lines apart and one frame scanning is completed by 6 fields of scanning. Also in this embodiment, the scanning selection signal is applied to scanning electrodes which are not adjacent to each other in 6 scanning fields. Further, in the embodiment shown in FIG. 13C, with respect to two successively applied scanning selection signals, a former pulse (voltage: $-V_2$) of a subsequent scanning selection signal is applied immediately after application of a latter pulse (voltage: $V_1$) of a preceding scanning selection signal.

In the above-described driving embodiments shown in FIGS. 11, 12 and 13, with respect to two successively applied scanning selection signals, a former pulse of a subsequent scanning selection signal is applied simultaneously with or immediately after the application of a latter pulse of a previous scanning selection signal, and also the subsequent scanning selection signal is applied before the completion of a data signal applied for data entry associated with the previous scanning selection signal.

Also in these embodiments, a scanning selection signal may be applied to the scanning electrodes with skipping of 4 or more lines apart, preferably 5–20 lines apart. Further, in the above embodiments, the peak values of the voltage signals $V_1$, $-V_2$ and $\pm V_3$ may preferably be set to satisfy the relation of $|V_1|=|-V_2|>|\pm V_3|$, particularly $|V_1|=|-V_2|\geqq 2|\pm V_3|$. Further, the pulse durations of these voltage signals may be set to 1 μsec–1 msec, preferably 10 μsec–100 μsec, and it is preferred to set a longer pulse duration at a lower temperature than at a higher temperature.

Figure 14:
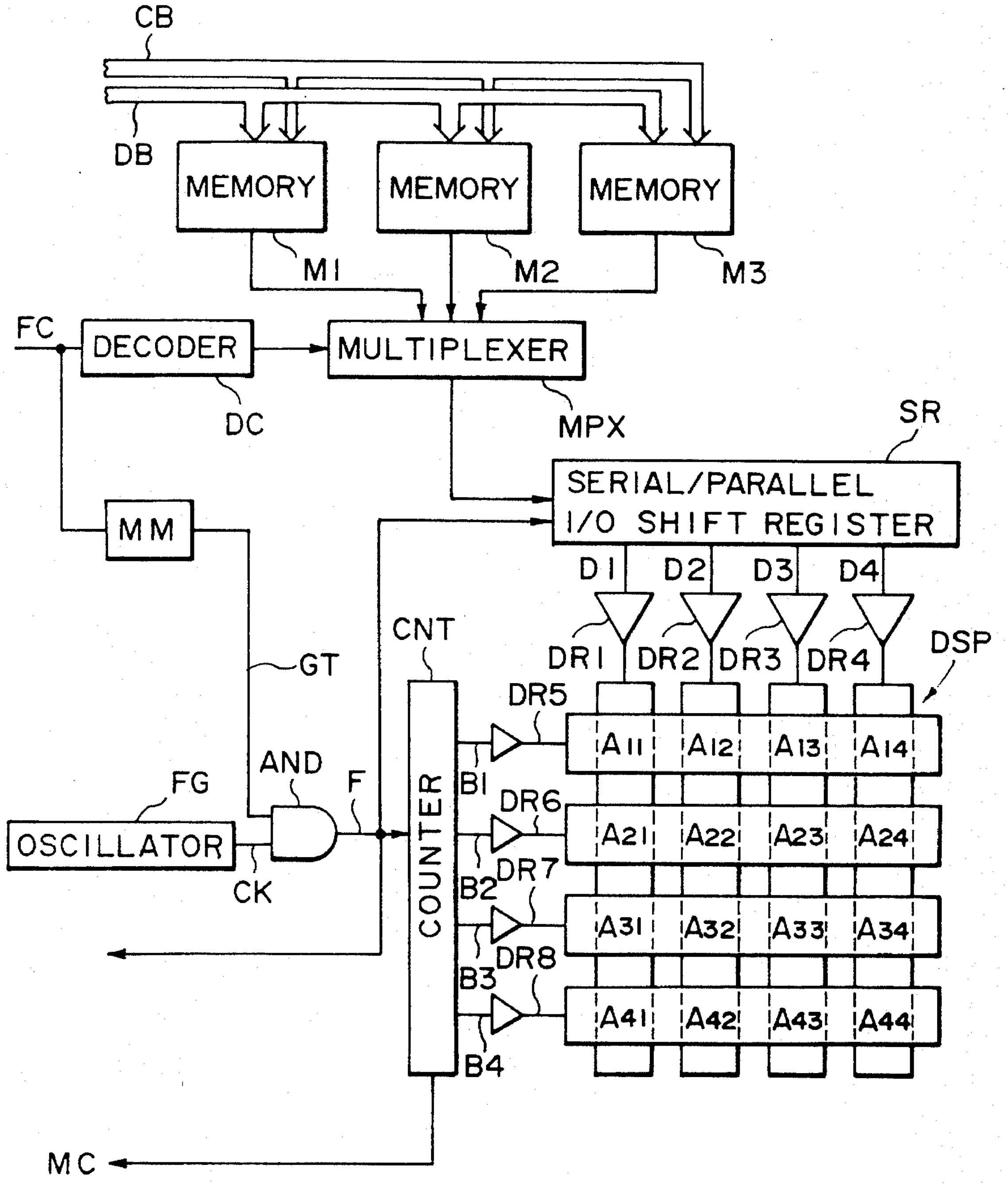
FIG. 14 is a circuit diagram illustrating a drive control circuit used in the invention.

FIG. 14 is a circuit diagram showing a liquid crystal display drive control system used in the present invention.

Referring to the figure, the system includes a liquid crystal display unit or panel DSP having pixels $A_{11}, A_{12}, \ldots, A_{44}$; and frame memories $M_1$, $M_2$ and $M_3$ each having a memory capacity of 4×4=16 bits. The memories $M_1$, $M_2$ and $M_3$ are supplied with data through a data bus DB and are controlled through a control bus CB with respect to writing/readout and addressing.

The system further includes a decoder DC to which a field switching signal FC is supplied, a multiplier MPX for selecting one of the outputs from the memories M1, M2 and M3, a monostable multi-vibrator MM supplying a gate signal GT to an AND gate to which clock signals CK are also supplied from a clock pulse oscillator FG, a counter CNT to which now-scanning clock signals F are supplied from the AND gate, a serial input/parallel output shift register SR, a column drive circuits $DR_1$–$DR_4$ and row drive circuits $DR_5$–$DR_8$.

Figure 17:
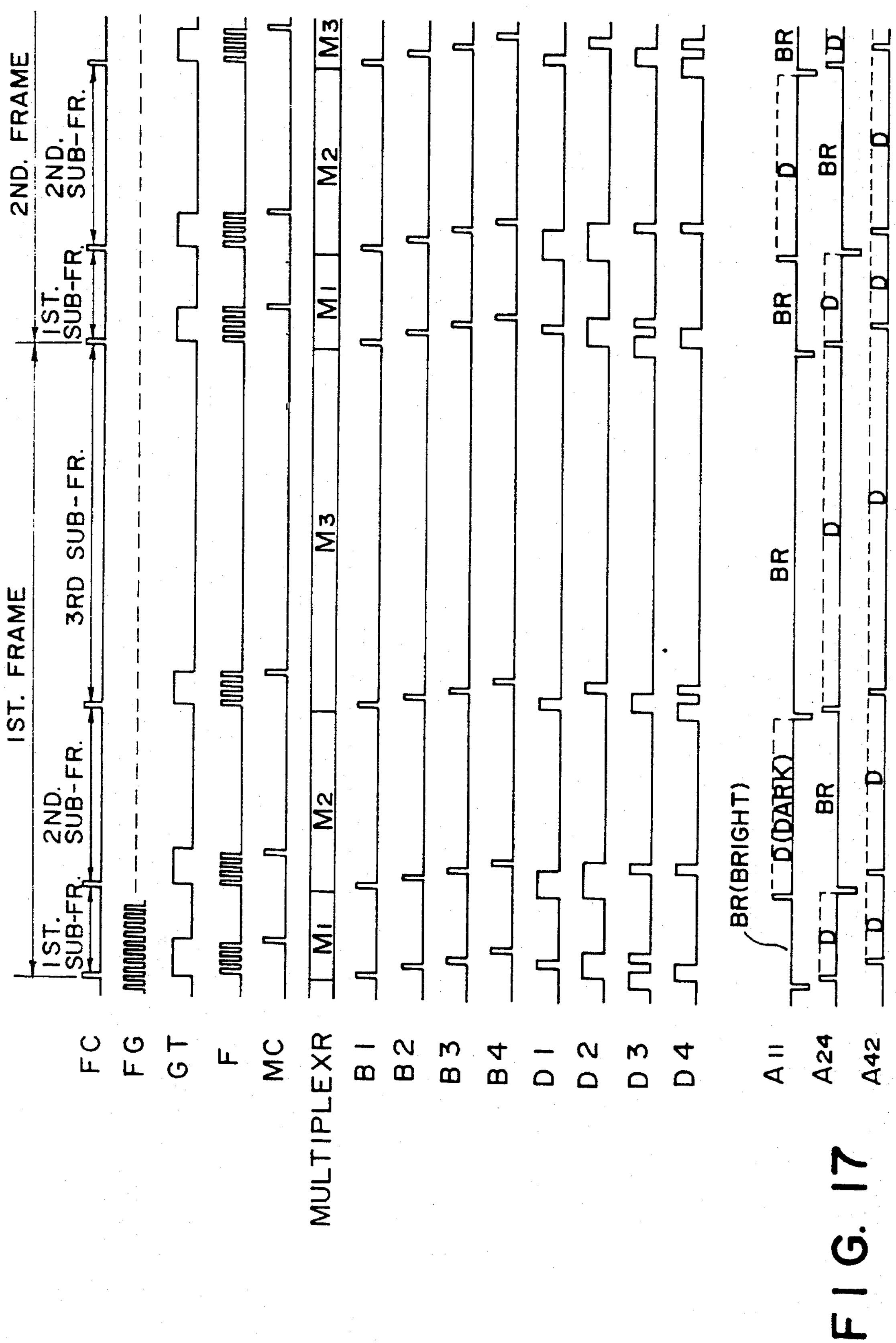
FIG. 17 is a time chart used in a drive system according to the invention.

Hereinbelow, the operation of the circuit shown in FIG. 14 is explained with reference to FIGS. 15–17.

FIG. 15 shows gradation data for respective pixels for one gradational picture scanning (referred to as "one frame"). The highest level bit HSB, the medium level but MSB and the lowest level bit LSB of each gradation data are inputted to the memories M3, M2 and M1, respectively, through the data but DB.

When one picture scanning (referred to as "one subframe") switching signal FC is generated at time $t_1$, the decoder DC sets the multiplexer MPX to receive data from the memory M1. Simultaneously, the signal FC is inputted to the monostable multi-vibrator MM to generate a gate signal GT and open the AND gate, thereby to supply four clock signals CK as a row scanning signal F to the counter CNT. The counter CNT turns the driver DR5 on receiving the first clock signal. At this time, the shift register SR is loaded with the first row data of the memory M1, and only the driver DR3 is made on. Accordingly, a liquid crystal pixel $A_{13}$ alone is set to a dark level and the other liquid crystal pixels $A_{11}$, $A_{12}$ and $A_{14}$ are set to a bright level. Then, the row scanning signal F is inputted to a controller (not shown) as a memory row scanning signal, the memory M1 supplies subsequent second row data to the shift register, the driver DR6 is turned on receiving a subsequent row scanning signal F, and simultaneously the second row data of the memory M1 are respectively supplied to the drivers DR1–DR4 from the shift register SR. At this time, the drivers DR2, DR3 and DR4 are turned on to set the pixels $A_{22}$, $A_{23}$ and $A_{24}$ to the dark level and the pixel $A_{21}$ to the bright level. The above operations are repeated for the third and fourth rows.

When the fourth row scanning signal F is inputted to the counter CNT, the counter CNT supplies a memory switching demand signal MC to a controller (not shown) to select the memory M2 to start a second sub-frame. At this time, the respective liquid crystal pixels set to bright or dark states retain their states because the ferroelectric liquid crystal has a memory function.

Similarly, in the second sub-frame, the multiplexer MPX selects data from the memory M2 based on a sub-frame switching signal FC, and a row scanning signal F is supplied to the counter CNT and the shift register SR based on a gate signal GT. Then, row scanning is performed in a similar cycle as in the first sub-frame to set the respective liquid crystal pixels to dark or bright states. A third frame is performed in a similar manner.

In this embodiment, the periods of the first, second and third sub-frames are set to ratios of 1:2:4 in the same values as the weights of the respective bits. Accordingly, the gradation data for, e.g., the pixel $A_{12}$ is 2 as shown in FIG. 16D, so that the pixel $A_{12}$ is set to the dark level only in the second sub-frame period and assumers the dark state for 2/7 of one frame period. Further, the gradation data for the pixel $A_{24}$ is 5, so that the pixel $A_{24}$ is set to the dark level for the first and third sub-frame periods and assumes the dark state for 5/7 of one frame period. Further, the gradation data for the pixel $A_{42}$ is 7, so that the pixel $A_{42}$ is caused to assume the dark state for all the sub-frame periods. Thus, gradational display at 8 levels can be performed in this embodiment.

In this way, an apparent intermediate toner or gray scale can be displayed by controlling the proportion of a display time in one frame period, i.e., a display duty. When the third sub-frame is finished to complete one frame, the data in the memories M1–M3 are rewritten through the control bus CB and the data bus DB, and data for a subsequent one frame are stored in the memories.

While one frame is divided into 3 sub-frames in this embodiment, an intermediate gradational display can be generally performed if one frame is divided into a plurality, i.e., two or more, of sub-frames. Further, the sub-frame periods are set to have different durations corresponding to the weights of data bits in the above embodiments, but the sub-frames can also be provided with equal durations by equal division. In this case, however, it is necessary to decode gradation data.

Figure 18:
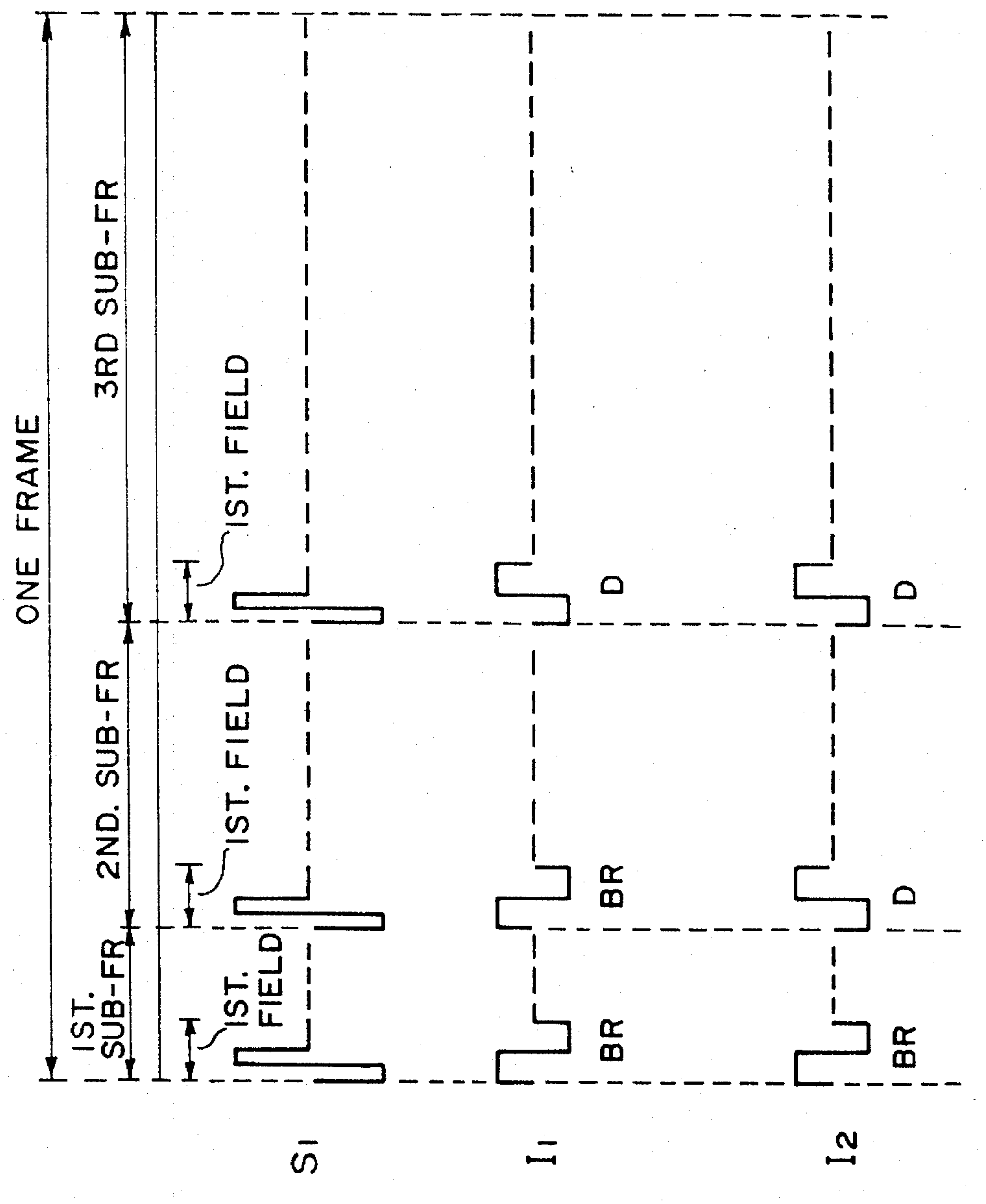
FIG. 18 is another example of driving waveform used in the invention.

FIG. 18 shows examples of drive waveforms applied to a scanning electrode $S_1$ and data electrodes $I_1$ and $I_2$ in one frame and first to third sub-frames contained therein. According to FIG. 18, the first, second and third sub-frames are set to have duration ratios of 1:2:4, respectively. As a result, the intersection of the scanning electrode $S_1$ and data electrode $I_1$ is provided with a gradational display corresponding to a weighted total of BR (bright) in the first sub-frame, BR in the second sub-frame and D (dark) in the third sub-frame. Further, the intersection of the scanning electrode $S_1$ and data electrode $I_2$ is provided with a gradational display corresponding to a weighted total of BR in the first sub-frame, D in the second sub-frame and D in the third sub-frame. Further, in this embodiment, the intersection of the scanning electrode $S_1$ and data electrode $I_2$ is set to have an area which is two times that of the intersection of the scanning electrode $S_1$ and data electrode $I_1$, and an increased variety of gradational display is performed based on such intersectional area ratios.

In effecting the gradational display explained with reference to FIGS. 14–18, the above-described driving methods explained with reference to FIGS. 4, 6, 7, 10 and 11–13 may be applied.

In the present invention, various ferroelectric liquid crystal devices can be used, including an SSFLC device as disclosed by Clark et al in U.S. Pat. No. 4,367,924, a ferroelectric liquid crystal device in an alignment state retaining a helical residue as disclosed by Isogai et al in U.S. Pat. No. 4,586,791 and a ferroelectric liquid crystal device in an alignment state as disclosed in U.K. Patent GB-A 2159635.

Figure 19:
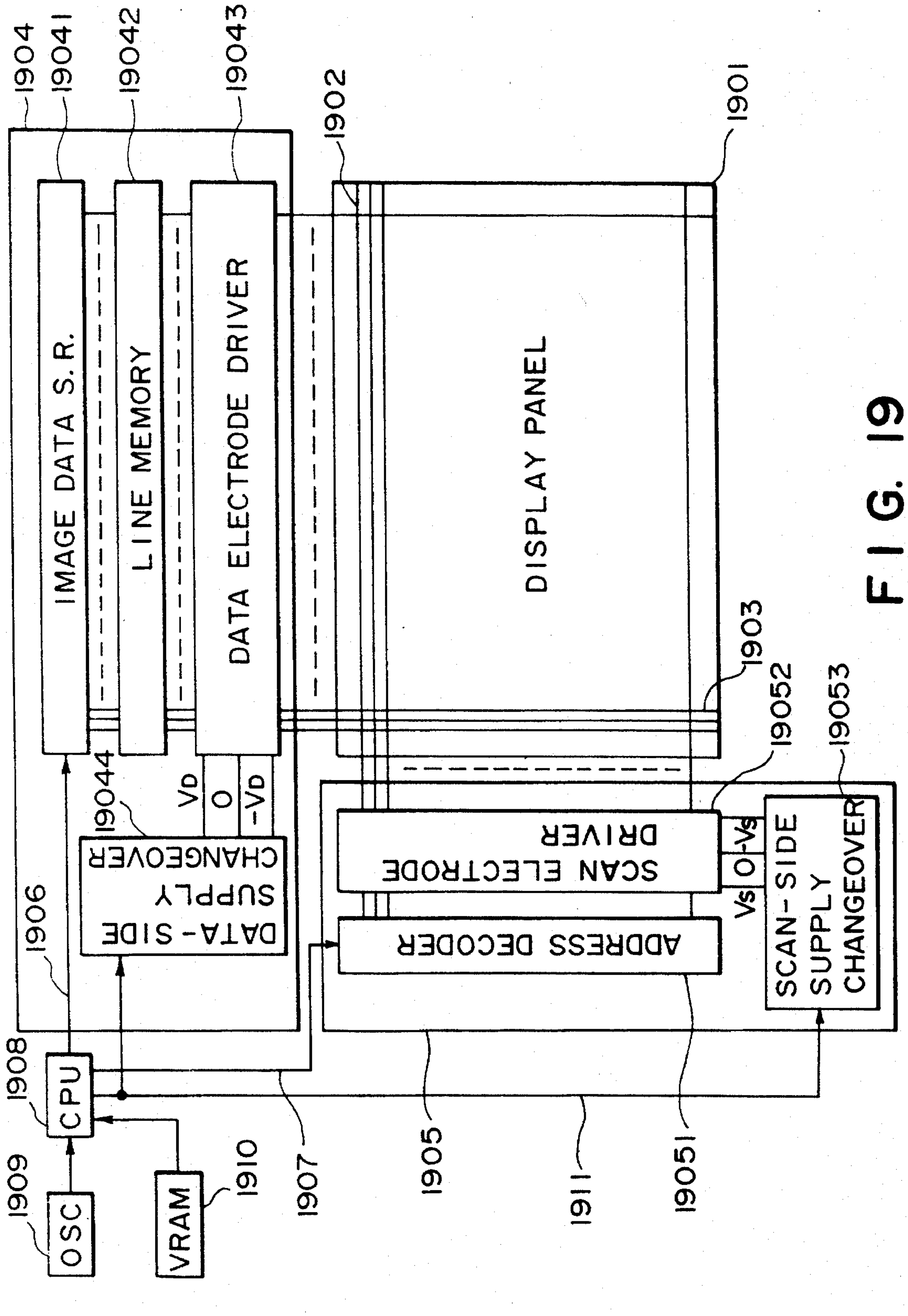
FIG. 19 is a block diagram of a liquid crystal apparatus according to the invention.

FIG. 19 is a block diagram illustrating a structural arrangement of an embodiment of the display apparatus according to the present invention. A display panel 1901 is composed of scanning electrodes 1902, data electrodes 1903 and a ferroelectric liquid crystal disposed therebetween. The orientation of the ferroelectric liquid crystal is controlled by an electric field at each intersection of the scanning electrodes 1902 and data electrodes 1903 formed due to voltages applied across the electrodes.

The display apparatus includes a data electrode driver circuit 1904, which in turn comprises an image data shift register 19041 for storing image data serially supplied from a data signal line 1906, a line memory 19042 for storing image data supplied in parallel from the image data shift register 19041, a data electrode driver 19043 for supplying voltages to data electrodes 1903 according to the image data stored in the line memory 19042, and a data side power supply changeover unit 19044 for changing over among voltages $V_D$, 0 and $-V_D$ supplied to the data electrodes 1903 based on a signal from a changeover control line 1911.

The display apparatus further includes a scanning electrode driver circuit 1905, which in turn comprises a decoder 19051 for designating a scanning electrode among all the scanning electrodes based on a signal received from a scanning address data line 1907, a scanning electrode driver 19052 for applying voltages to the scanning electrodes 1902 based on a signal from the decoder 19051, and a scanning side power supply changeover unit 19053 for changing over among voltages $V_S$, 0 and $-V_S$ supplied to the scanning electrodes 1902 based on a signal from a changeover control line 1911.

The display apparatus further includes a CPU 19019, which receives clock pulses from an oscillator 1909, controls the image memory 1910, and controls the signal transfer over the data signal line 1906, scanning address data line 1907 and changeover control line 1911.

As described above, according to the present invention, it is possible to effectively suppress the occurrence of flicker caused by scanning drive at a low frame frequency as low as 2–15 Hz. Particularly, the occurrence of flicker is prevented for a long scanning selection period set at a low temperature, whereby it is possible to provide a high-quality display picture over a substantially wide temperature range. According to the present invention, it is further possible to effectively prevent a phenomenon of image flow, whereby a high-quality display picture, particularly gradational display picture, can be formed also in this respect.

What is claimed is:

1. A liquid crystal apparatus, comprising:

(a) a liquid crystal device comprising an electrode matrix composed of scanning electrodes and data electrodes disposed to intersect the scanning electrodes, and a chiral smectic liquid crystal showing a first and a second orientation state disposed between the scanning electrodes and the data electrodes; and (b) a driving means including:

a first drive means for sequentially applying a scanning selection signal to said scanning electrodes two or more scanning electrodes apart between successively selected scanning electrodes in one vertical scanning and for effecting one picture scanning by scanning said scanning electrodes in at least two vertical scannings, wherein during a latter one of two consecutive vertical scannings of the at least two vertical scannings in one picture scanning, the scanning selection signal is applied to scanning electrodes which are not adjacent to scanning electrodes to which the scanning selection signal is applied in a former one of the two consecutive vertical scannings, said scanning selection signal having a former voltage of one polarity and a latter voltage of an opposite polarity with respect to the voltage level of a nonselected scanning electrode, two successive scanning selection signals including a former and a latter scanning selection signal being applied to the scanning electrodes in such a time relationship that the former voltage of one polarity of the latter scanning selection signal is commenced to be applied before the completion of a data signal associated with the former scanning selection signal, before the termination of the latter voltage of an opposite polarity of the former scanning selection signal and after the application of the voltage of one polarity of the former scanning selection signal, a second means for applying to all or a prescribed number of the data electrodes a voltage signal which provides a voltage causing the first orientation state of the chiral smectic liquid crystal in combination with the voltage of one polarity of the scanning selection signal, and applying to a selected data electrode a voltage signal which provides a voltage causing the second orientation state of the chiral smectic liquid crystal, and a third means for discriminating the first orientation state and the second orientation state of the chiral smectic liquid crystal respectively as a dark state and a bright state, said third means including a pair of cross nicol polarizers disposed so as to sandwich said chiral smectic liquid crystal and provide (i) said dark state at all or a prescribed number of the intersections of the data electrodes and a scanning electrode when said former voltage of one polarity in said scanning selection signal is applied to the scanning electrode and (ii) said bright state at the intersection of the selected data electrode and the scanning electrode when said latter voltage of an opposite polarity in said scanning selection signal is applied to the scanning electrode.

2. A liquid crystal apparatus, comprising:

(a) a liquid crystal device comprising an electrode matrix composed of scanning electrodes and data electrodes disposed to intersect the scanning electrodes, and a chiral smectic liquid crystal showing a first and a second orientation state disposed between the scanning electrodes and the data electrodes, at least one type of said scanning electrodes and data electrodes in a display region being formed in at least two different electrode widths; and (b) a driving means including:

a first drive means for sequentially applying a scanning selection signal to said scanning electrodes two or more scanning electrodes apart between successively selected scanning electrodes in one vertical scanning and for effecting one picture scanning by scanning said scanning electrodes in at least two vertical scannings, wherein during a latter one of two consecutive vertical scannings of the at least two vertical scannings in one picture scanning, the scanning selection signal is applied to scanning electrodes which are not adjacent to scanning electrodes to which the scanning selection signal is applied in a former one of the two consecutive vertical scannings, said scanning selection signal having a former voltage of one polarity and a latter voltage of an opposite polarity with respect to the voltage level of a nonselected scanning electrode, two successive scanning selection signals including a former and a latter scanning selection signal being applied to the scanning electrodes in such a time relationship that the former voltage of one polarity of the latter scanning selection signal is commenced to be applied before the completion of a data signal associated with the former scanning selection signal, before the termination of the latter voltage of an opposite polarity of the former scanning selection signal and after the application of the voltage of one polarity of the former scanning selection signal, a second means for applying to all or a prescribed number of the data electrodes a voltage signal which provides a voltage causing the first orientation state of the chiral smectic liquid crystal in combination with the voltage of one polarity of the scanning selection signal, and applying to a selected data electrode a voltage signal which provides a voltage causing the second orientation state of the chiral smectic liquid crystal, and a third means for discriminating the first orientation state and the second orientation state of the chiral smectic liquid crystal respectively as a dark state and a bright state, said third means including a pair of cross nicol polarizers disposed so as to sandwich said chiral smectic liquid crystal and provide (i) said dark state at all or a prescribed number of the intersections of the data electrodes and a scanning electrode when said former voltage of one polarity in said scanning selection signal is applied to the scanning electrode and (ii) said bright state at the intersection of the selected data electrode and the scanning electrode when said latter voltage of an opposite polarity in said scanning selection signal is applied to the scanning electrode.

3. A display system, comprising:

(a) an image memory for storing image data, (b) a liquid crystal device comprising an electrode matrix composed of scanning electrodes and data electrodes disposed to intersect the scanning electrodes, and a chiral smectic liquid crystal showing a first and a second orientation state disposed between the scanning electrodes and the data electrodes;

(c) a driving means including:

a first drive means for sequentially applying a scanning selection signal to scanning electrodes which are not adjacent to each other in one vertical scanning so as to effect one picture scanning in plural times of vertical scanning, said scanning selection signal having a former voltage of one polarity and a latter voltage of an opposite polarity with respect to the voltage level of a nonselected scanning electrode, two successive scanning selection signals including a former and a latter scanning selection signal being applied to the scanning electrodes in such a time relationship that the former voltage of one polarity of the latter scanning selection signal is commenced to be applied before the completion of a data signal associated with the former scanning selection signal, before the termination of the latter voltage of an opposite polarity of the former scanning selection signal and after the application of the voltage of one polarity of the former scanning selection signal, a second means for applying to all or a prescribed number of the data electrodes a voltage signal which provides a voltage causing the first orientation state of the chiral smectic liquid crystal in combination with the voltage of one polarity of the scanning selection signal, and applying to a selected data electrode a voltage signal which provides a voltage causing the second orientation state of the chiral smectic liquid crystal, and (d) a control means for controlling the drive means (c) so as to effect a display corresponding to data signals outputted from the image memory, and a third means for discriminating the first orientation state and the second orientation state of the chiral smectic liquid crystal respectively as a dark state and a bright state, said third means including a pair of cross nicol polarizers disposed so as to sandwich said chiral smectic liquid crystal and provide (i) said dark state at all or a prescribed number of the intersections of the data electrodes and a scanning electrode when said former voltage of one polarity in said scanning selection signal is applied to the scanning electrode and (ii) said bright state at the intersection of the selected data electrode and the scanning electrode when said latter voltage of an opposite polarity in said scanning selection signal is applied to the scanning electrode.

4. A display system, comprising:

(a) an image memory for storing image data, (b) a liquid crystal device comprising an electrode matrix composed of scanning electrodes and data electrodes disposed to intersect the scanning electrodes, and a chiral smectic liquid crystal showing a first and a second orientation state disposed between the scanning electrodes and the data electrodes, at least one type of said scanning electrodes and data electrodes in a display region being formed in at least two different electrode widths; and (c) a driving means including:

a first drive means for sequentially applying a scanning selection signal to scanning electrodes which are not adjacent to each other in one vertical scanning so as to effect one picture scanning in plural times of vertical scanning, said scanning selection signal having a former voltage of one polarity and a latter voltage of an opposite polarity with respect to the voltage level of a nonselected scanning electrode, two successive scanning selection signals including a former and a latter scanning selection signal being applied to the scanning electrodes in such a time relationship that the former voltage of one polarity of the latter scanning selection signal is commenced to be applied before the completion of a data signal associated with the former scanning selection signal, before the termination of the latter voltage of an opposite polarity of the former scanning selection signal and after the application of the voltage of one polarity of the former scanning selection signal, and a second means for applying to all or a prescribed number of the data electrodes a voltage signal which provides a voltage causing the first orientation state of the chiral smectic liquid crystal in combination with the voltage of one polarity of the scanning selection signal, and applying to a selected data electrode a voltage signal which provides a voltage causing the second orientation state of the chiral smectic liquid crystal, (d) a control means for controlling the drive means (c) so as to effect a display corresponding to data signals outputted from the image memory, and (e) a third means for discriminating the first orientation state and the second orientation state of the chiral smectic liquid crystal respectively as a dark state and a bright state, said third means including a pair of cross nicol polarizers disposed so as to sandwich said chiral smectic liquid crystal and provide (i) said dark state at all or a prescribed number of the intersections of the data electrodes and a scanning electrode when said former voltage of one polarity in said scanning selection signal is applied to the scanning electrode and (ii) said bright state at the intersection of the selected data electrode and the scanning electrode when said latter voltage of an opposite polarity in said scanning selection signal is applied to the scanning electrode.

5. A liquid crystal apparatus, comprising:

(a) a liquid crystal device comprising an electrode matrix composed of scanning electrodes and data electrodes disposed to intersect the scanning electrodes, and a liquid crystal having a memory characteristic and showing a first and a second orientation state disposed between the scanning electrodes and the data electrodes; and (b) a driving means including:

a first drive means for sequentially applying a scanning selection signal to said scanning electrodes two or more scanning electrodes apart between successively selected scanning electrodes in one vertical scanning and for effecting one picture scanning by scanning said scanning electrodes in at least two vertical scannings, said scanning selection signal having a former first voltage and a latter second voltage different from the former first voltage, two successive scanning selection signals including a former and a latter scanning selection signal being applied to the scanning electrodes in such a time relationship that the former first voltage of the latter scanning selection signal is commenced to be applied before the completion of a data signal associated with the former scanning selection signal, before the termination of the latter second voltage of the former scanning selection signal and after the application of the first voltage of the former scanning selection signal, and a second means for applying to all or a prescribed number of the data electrodes a voltage signal which provides a voltage causing the first orientation state of the liquid crystal in combination with the former first voltage of the scanning selection signal, and applying to a selected data electrode a voltage signal which provides a voltage causing the second orientation state of the liquid crystal.

6. An apparatus according to claim 5, wherein said liquid crystal is a chiral smectic liquid crystal.

7. A liquid crystal apparatus, comprising:

(a) a liquid crystal device comprising an electrode matrix composed of scanning electrodes and data electrodes disposed to intersect the scanning electrodes, and a liquid crystal having a memory characteristic and showing a first and a second orientation state disposed between the scanning electrodes and the data electrodes, at least one type of said scanning electrodes and data electrodes in a display region being formed in at least two different electrode widths; and (b) a driving means including:

a first drive means for sequentially applying a scanning selection signal to said scanning electrodes two or more scanning electrodes apart between successively selected scanning electrodes in one vertical scanning and for effecting one picture scanning by scanning said scanning electrodes in at least two vertical scannings, said scanning selection signal having a former first voltage and a latter second voltage different from the former first voltage, two successive scanning selection signals including a former and a latter scanning selection signal being applied to the scanning electrodes in such a time relationship that the former first voltage of the latter scanning selection signal is commenced to be applied before the completion of a data signal associated with the former scanning selection signal, before the termination of the latter second voltage of the former scanning selection signal and after the application of the first voltage of the former scanning selection signal, and a second means for applying to all or a prescribed number of the data electrodes a voltage signal which provides a voltage causing the first orientation state of the liquid crystal in combination with the former first voltage of the scanning selection signal, and applying to a selected data electrode a voltage signal which provides a voltage causing the second orientation state of the liquid crystal.

8. An apparatus according to claim 7, wherein said liquid crystal is a chiral smectic liquid crystal.

9. A display system, comprising:

(a) an image memory for storing image data, (b) a liquid crystal device comprising an electrode matrix composed of scanning electrodes and data electrodes disposed to intersect the scanning electrodes, and a liquid crystal having a memory characteristic and showing a first and a second orientation state disposed between the scanning electrodes and the data electrodes;

(c) a driving means including:

a first drive means for sequentially applying a scanning selection signal to said scanning electrodes two or more scanning electrodes apart between successively selected scanning electrodes in one vertical scanning and for effecting one picture scanning by scanning said scanning electrodes in at least two vertical scannings, said scanning selection signal having a former first voltage and a latter second voltage different from the first voltage, two successive scanning selection signals including a former and a latter scanning selection signal being applied to the scanning electrodes in such a time relationship that the former first voltage of the latter scanning selection signal is commenced to be applied before the completion of a data signal associated with the former scanning selection signal, before the termination of the latter second voltage of the former scanning selection signal and after the application of the first voltage of the former scanning selection signal, and a second means for applying to all or a prescribed number of the data electrodes a voltage signal which provides a voltage causing the first orientation state of the liquid crystal in combination with the first voltage of the scanning selection signal, and applying to a selected data electrode a voltage signal which provides a voltage causing the second orientation state of the liquid crystal, and (d) a control means for controlling the drive means (c) so as to effect a display corresponding to data signals outputted from the image memory.

10. An apparatus according to claim 9, wherein said liquid crystal is a chiral smectic liquid crystal.

11. A display system, comprising:

(a) an image memory for storing image data, (b) a liquid crystal device comprising an electrode matrix composed of scanning electrodes and data electrodes disposed to intersect the scanning electrodes, and a liquid crystal having a memory characteristic and showing a first and a second orientation state disposed between the scanning electrodes and the data electrodes, at least one type of said scanning electrodes and data electrodes in a display region being formed in at least two different electrode widths; and (c) a driving means including:

a first drive means for sequentially applying a scanning selection signal to said scanning electrodes two or more scanning electrodes apart between successively selected scanning electrodes in one vertical scanning and for effecting one picture scanning by scanning said scanning electrodes in at least two vertical scannings, said scanning selection signal having a former first voltage and a latter second voltage different from the first voltage, two successive scanning selection signals including a former and a latter scanning selection signal being applied to the scanning electrodes in such a time relationship that the former first voltage of the latter scanning selection signal is commenced to be applied before the completion of a data signal associated with the former scanning selection signal, before the termination of the latter second voltage of the former scanning selection signal and after the application of the first voltage of the former scanning selection signal, and a second means for applying to all or a prescribed number of the data electrodes a voltage signal which provides a voltage causing the first orientation state of the liquid crystal in combination with the first voltage of the scanning selection signal, and applying to a selected data electrode a voltage signal which provides a voltage causing the second orientation state of the liquid crystal, and (d) a control means for controlling the drive means (c) so as to effect a display corresponding to data signals outputted from the image memory.

12. An apparatus according to claim 11, wherein said liquid crystal is a chiral smectic liquid crystal.

13. A driving method for a liquid crystal apparatus comprising an electrode matrix composed of scanning electrodes and data electrodes disposed to intersect the scanning electrodes, and a liquid crystal having a memory characteristic showing a first and a second orientation state disposed between the scanning electrodes and the data electrodes; said driving method comprising the steps of:

(a) sequentially applying a scanning selection signal to said scanning electrodes two or more scanning electrodes apart between successively selected scanning electrodes in one vertical scanning and for effecting one picture scanning by making at least two vertical scannings, said scanning selection signal having a former first voltage and a latter second voltage different from the former first voltage, two successive scanning selection signals including a former and a latter scanning selection signal being applied to the scanning electrodes in such a time relationship that the former first voltage of the latter scanning selection signal is commenced to be applied before the completion of a data signal associated with the former scanning selection signal, before the termination of the latter second voltage of the former scanning selection signal and after the application of the first voltage of the former scanning selection signal, and (b) applying to all or a prescribed number of the data electrodes a voltage signal which provides a voltage causing the first orientation state of the liquid crystal in combination with the former first voltage of the scanning selection signal, and applying to a selected data electrode a voltage signal which provides a voltage causing the second orientation state of the liquid crystal.

14. A method according to claim 13, wherein said liquid crystal is a chiral smectic liquid crystal.

15. A liquid crystal apparatus, comprising:

(a) a liquid crystal device comprising an electrode matrix composed of scanning electrodes and data electrodes disposed to intersect the scanning electrodes, and a liquid crystal having a memory characteristic and showing plural orientation states disposed between the scanning electrodes and the data electrodes; and (b) a driving means including:

a first drive means for sequentially applying a scanning selection signal to said scanning electrodes two or more scanning electrodes apart between successively selected scanning electrodes in one vertical scanning and for effecting one picture scanning by scanning said scanning electrodes in at least two vertical scannings, said scanning selection signal having a former first voltage and a latter second voltage different from the former first voltage, two successive scanning selection signals including a former and a latter scanning selection signal being applied to the scanning electrodes in such a time relationship that the former first voltage of the latter scanning selection signal is commenced to be applied before the completion of a data signal associated with the former scanning selection signal, before the termination of the latter second voltage of the former scanning selection signal and after the application of the first voltage of the former scanning selection signal, and a second means for applying to all or a prescribed number of the data electrodes a voltage signal which provides a voltage causing an erased orientation state of the liquid crystal in combination with the former first voltage of the scanning selection signal, and applying to a selected data electrode a voltage signal which provides a voltage causing a second orientation state of the liquid crystal.

16. An apparatus according to claim 15, wherein said liquid crystal is a chiral smectic liquid crystal.

17. A liquid crystal apparatus, comprising:

(a) a liquid crystal device comprising an electrode matrix composed of scanning electrodes and data electrodes disposed to intersect the scanning electrodes, and a liquid crystal having a memory characteristic and showing plural orientation states disposed between the scanning electrodes and the data electrodes, at least one type of said scanning electrodes and data electrodes in a display region being formed in at least two different electrode widths; and (b) a driving means including:

a first drive means for sequentially applying a scanning selection signal to said scanning electrodes two or more scanning electrodes apart between successively selected scanning electrodes in one vertical scanning and for effecting one picture scanning by scanning said scanning electrodes in at least two vertical scannings, said scanning selection signal having a former first voltage and a latter second voltage different from the former first voltage, two successive scanning selection signals including a former and a latter scanning selection signal being applied to the scanning electrodes in such a time relationship that the former first voltage of the latter scanning selection signal is commenced to be applied before the completion of a data signal associated with the former scanning selection signal, before the termination of the latter second voltage of the former scanning selection signal and after the application of the first voltage of the former scanning selection signal, and a second means for applying to all or a prescribed number of the data electrodes a voltage signal which provides a voltage causing an erased orientation state of the liquid crystal in combination with the former first voltage of the scanning selection signal, and applying to a selected data electrode a voltage signal which provides a voltage causing a selected orientation state of the liquid crystal.

18. An apparatus according to claim 17, wherein said liquid crystal is a chiral smectic liquid crystal.

19. A display system, comprising:

(a) an image memory for storing image data, (b) a liquid crystal device comprising an electrode matrix composed of scanning electrodes and data electrodes disposed to intersect the scanning electrodes, and a liquid crystal having a memory characteristic and showing plural orientation states disposed between the scanning electrodes and the data electrodes;

(c) a driving means including:

a first drive means for sequentially applying a scanning selection signal to said scanning electrodes two or more scanning electrodes apart between successively selected scanning electrodes in one vertical scanning and for effecting one picture scanning by scanning said scanning electrodes in at least two vertical scannings, said scanning selection signal having a former first voltage and a latter second voltage different from the first voltage, two successive scanning selection signals including a former and a latter scanning selection signal being applied to the scanning electrodes in such a time relationship that the former first voltage of the latter scanning selection signal is commenced to be applied before the completion of a data signal associated with the former scanning selection signal, before the termination of the latter second voltage of the former scanning selection signal and after the application of the first voltage of the former scanning selection signal, and a second means for applying to all or a prescribed number of the data electrodes a voltage signal which provides a voltage causing an erased orientation state of the liquid crystal in combination with the first voltage of the scanning selection signal, and applying to a selected data electrode a voltage signal which provides a voltage causing a selected orientation state of the liquid crystal, and (d) a control means for controlling the drive means (c) so as to effect a display corresponding to data signals outputted from the image memory.

20. An apparatus according to claim 19, wherein said liquid crystal is a chiral smectic liquid crystal.

21. A display system, comprising:

(a) an image memory for storing image data, (b) a liquid crystal device comprising an electrode matrix composed of scanning electrodes and data electrodes disposed to intersect the scanning electrodes, and a liquid crystal having a memory characteristic and showing plural orientation states disposed between the scanning electrodes and the data electrodes, at least one type of said scanning electrodes and data electrodes in a display region being formed in at least two different electrode widths; and (c) a driving means including:

a first drive means for sequentially applying a scanning selection signal to said scanning electrodes two or more scanning electrodes apart between successively selected scanning electrodes in one vertical scanning and for effecting one picture scanning by scanning said scanning electrodes in at least two vertical scannings, said scanning selection signal having a former first voltage and a latter second voltage different from the first voltage, two successive scanning selection signals including a former and a latter scanning selection signal being applied to the scanning electrodes in such a time relationship that the former first voltage of the latter scanning selection signal is commenced to be applied before the completion of a data signal associated with the former scanning selection signal, before the termination of the latter second voltage of the former scanning selection signal and after the application of the first voltage of the former scanning selection signal, and a second means for applying to all or a prescribed number of the data electrodes a voltage signal which provides a voltage causing an erased orientation state of the liquid crystal in combination with the first voltage of the scanning selection signal, and applying to a selected data electrode a voltage signal which provides a voltage causing a selected orientation state of the liquid crystal, and (d) a control means for controlling the drive means (c) so as to effect a display corresponding to data signals outputted from the image memory.

22. An apparatus according to claim 21, wherein said liquid crystal is a chiral smectic liquid crystal.

23. A driving method for a liquid crystal apparatus comprising an electrode matrix composed of scanning electrodes and data electrodes disposed to intersect the scanning electrodes, and a liquid crystal having a memory characteristic showing plural orientation states disposed between the scanning electrodes and the data electrodes; said driving method comprising the steps of:

(a) sequentially applying a scanning selection signal to said scanning electrodes two or more scanning electrodes apart between successively selected scanning electrodes in one vertical scanning and for effecting one picture scanning by scanning said scanning electrodes in at least two vertical scannings, said scanning selection signal having a former first voltage and a latter second voltage different from the former first voltage, two successive scanning selection signals including a former and a latter scanning selection signal being applied to the scanning electrodes in such a time relationship that the former first voltage of the latter scanning selection signal is commenced to be applied before the completion of a data signal associated with the former scanning selection signal, before the termination of the latter second voltage of the former scanning selection signal and after the application of the first voltage of the former scanning selection signal, and (b) applying to all or a prescribed number of the data electrodes a voltage signal which provides a voltage causing an erased orientation state of the liquid crystal in combination with the former first voltage of the scanning selection signal, and applying to a selected data electrode a voltage signal which provides a voltage causing a selected orientation state of the liquid crystal.

24. A method according to claim 23, wherein said liquid crystal is a chiral smectic liquid crystal.

25. A driving method for driving an optical modulation device comprising a plurality of picture elements arranged in the form of a matrix having a plurality of rows and a plurality of columns defined by the intersections of scanning electrodes arranged in rows and signal electrodes arranged in columns, and a liquid crystal having a memory characteristic, the picture elements in each row being selectively supplied with either a voltage for orienting the liquid crystal to one display state, or another voltage for orienting the liquid crystal to another display state, said driving method comprising the steps of:

sequentially applying a scanning selection signal comprising a former voltage signal of a first voltage and a latter voltage signal of a second voltage to the scanning electrodes to sequentially select a particular scanning electrode in such a sequence that the scanning selection signal is applied to said scanning electrodes two or more scanning electrodes apart between successively selected scanning electrodes in one vertical scanning and for effecting one picture scanning by making at least two vertical scannings; and applying data signals to the signal electrodes, each data signal comprising an information signal for selecting a display state of a picture element on the particular scanning electrode and each data signal having a waveform providing a pulse train of voltage applied to picture elements at intersections of scanning electrodes not receiving the scanning selection signal and signal electrodes, including at least one pulse having a pulse width shorter than that of said latter voltage signal, whereby the picture elements on the particular scanning electrode supplied with the former voltage signal are non-selectively erased into an erased state and a picture element on the particular scanning electrode supplied with the latter voltage signal is placed in either the one display state or the other display state depending on an information signal; and applying the former voltage signal of a subsequent scanning selection signal to a scanning electrode selected subsequent to the particular scanning electrode during the period of applying the data signals for selecting the display state of the picture elements on said particular scanning electrode.

26. An optical modulation apparatus, comprising:

an optical modulation device having:

a plurality of picture elements arranged in the form of a matrix having a plurality of rows and a plurality of columns, scanning electrodes arranged in rows and signal electrodes arranged in columns defining said matrix of picture elements, and a liquid crystal having a memory characteristic disposed between the scanning electrodes and the data electrodes; and driving means for (a) sequentially applying a scanning selection signal comprising a former voltage signal of a first voltage and a latter voltage signal of a second voltage to the scanning electrodes to sequentially select a particular scanning electrode in such a sequence that the scanning selection signal is applied to said scanning electrodes two or more scanning electrodes apart between successively selected scanning electrodes in one vertical scanning and for effecting one picture scanning by scanning said scanning electrodes in at least two vertical scannings; and applying data signals to the signal electrodes, each data signal comprising an information signal for selecting a display state of a picture element on the particular scanning electrode and each data signal having a waveform providing a pulse train of voltage applied to picture elements at intersections of scanning electrodes not receiving the scanning selection signals and signal electrodes, including at least one pulse having a pulse width shorter than that of said latter voltage signal, whereby the picture elements on the particular scanning electrode supplied with the first voltage signal are non-selectively erased into an erased state and each of the picture elements on the particular scanning electrode supplied with the second voltage signal is placed in either one display state or another display state depending on the information signal applied thereto; and (b) applying the first voltage signal of a subsequent scanning selection signal to a scanning electrode selected subsequent to said particular scanning electrode during the period of applying the data signals for selecting display states of the picture elements on said particular scanning electrode.

27. An optical modulation apparatus, comprising:

an optical modulation device having:

a plurality of picture elements arranged in the form of a matrix having a plurality of rows and a plurality of columns, scanning electrodes arranged in rows and signal electrodes arranged in columns defining said matrix of picture elements, and a liquid crystal having a memory characteristic disposed between the scanning electrodes and signal electrodes; and driving means for (a) sequentially applying a scanning selection signal comprising a former voltage signal of a first voltage and a latter voltage signal of a second voltage signal to the scanning electrodes to sequentially select a particular scanning electrode in such a sequence that the scanning selection is applied to said scanning electrodes two or more scanning electrodes apart between successively selected scanning electrodes in one vertical scanning and for effecting one picture scanning by scanning said scanning electrodes in at least two vertical scannings; and applying data signals to the signal electrodes, each data signal comprising an information signal for selecting a display state of a picture element on the particular scanning electrode, so that the picture elements on the particular scanning electrode supplied with the first voltage signal are non-selectively erased into an erased state and a picture elements on the particular scanning electrode supplied with the second voltage signal are respectively selected in display states depending on the information signals applied in synchronism with the second voltage signal;

(b) applying the first voltage signal of a subsequent scanning selection signal to a scanning electrode selected subsequent to the particular scanning electrode during the period of applying the data signals for selecting the display states of the picture elements on said particular scanning electrode; and (c) applying an AC voltage which does not change the selected display states of the picture elements on the particular scanning electrode to the picture elements when the particular scanning electrode is not supplied with the scanning selection signal.

* * * * *

UNITED STATES PATENT AND TRADEMARK OFFICE
CERTIFICATE OF CORRECTION

PATENT NO. : 5,615,027

DATED : March 25, 1997

INVENTOR(S) : MASAKI KURIBAYASHI, ET AL.

It is certified that error appears in the above-identified patent and that said Letters Patent is hereby corrected as shown below:

COLUMN 5

Line 16, "then" should read --than--.

COLUMN 12

Line 31, "but" should read --bus--.

COLUMN 13

Line 9, "assumers" should read --assumes--.

COLUMN 26

Line 21, "a" should read --the--.

Signed and Sealed this

Fourth Day of November, 1997

Attest:

BRUCE LEHMAN

Attesting Officer

*Commissioner of Patents and Trademarks*